(12) United States Patent
Musha

(10) Patent No.: US 10,789,981 B2
(45) Date of Patent: Sep. 29, 2020

(54) MAGNETIC TAPE READING APPARATUS AND A MAGNETIC TAPE READING METHOD

(71) Applicant: FUJIFILM Corporation, Tokyo (JP)

(72) Inventor: Atsushi Musha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/401,776

(22) Filed: May 2, 2019

(65) Prior Publication Data

US 2019/0341074 A1    Nov. 7, 2019

(30) Foreign Application Priority Data

May 7, 2018 (JP) .................................. 2018-089371
May 23, 2018 (JP) .................................. 2018-098986

(51) Int. Cl.
| | | |
|---|---|---|
| *G11B 5/09* | (2006.01) | |
| *G11B 20/10* | (2006.01) | |
| *G11B 5/78* | (2006.01) | |
| *G11B 5/584* | (2006.01) | |
| *G11B 5/008* | (2006.01) | |

(52) U.S. Cl.
CPC .... *G11B 20/10055* (2013.01); *G11B 5/00813* (2013.01); *G11B 5/584* (2013.01); *G11B 5/78* (2013.01)

(58) Field of Classification Search
None
See application file for complete search history.

(56) References Cited

U.S. PATENT DOCUMENTS

| | | | | |
|---|---|---|---|---|
| 4,590,524 A | * | 5/1986 | Okamoto | G11B 20/10527 360/32 |
| 4,727,438 A | * | 2/1988 | Juso | G11B 5/584 360/25 |
| 5,305,159 A | * | 4/1994 | Sakai | G11B 5/59655 360/77.02 |
| 5,544,140 A | * | 8/1996 | Seagrave | G11B 20/1806 360/32 |
| 5,606,469 A | * | 2/1997 | Kosugi | G11B 5/59633 360/75 |
| 7,755,863 B2 | | 7/2010 | Neumann et al. | |
| 8,861,111 B1 | * | 10/2014 | Liao | G11B 5/09 360/39 |

(Continued)

FOREIGN PATENT DOCUMENTS

| | | |
|---|---|---|
| JP | 2008-282501 A | 11/2008 |
| JP | 2011-134372 A | 7/2011 |
| JP | 2016-110680 A | 6/2016 |

*Primary Examiner* — Peter Vincent Agustin
(74) *Attorney, Agent, or Firm* — Sughrue Mion, PLLC

(57) ABSTRACT

A magnetic tape reading apparatus includes a reading element unit which includes: a plurality of reading elements which are disposed in a state of being adjacent to each other and each of which reads data by a linear scanning method from a specific track region including a reading target track in a track region included in a magnetic tape; and an extraction unit which performs a waveform equalization process according to a deviation amount between positions of the magnetic tape and the reading element unit, with respect to each reading result for each reading element, to extract data derived from the reading target track from the reading result.

12 Claims, 15 Drawing Sheets

(56) References Cited

U.S. PATENT DOCUMENTS

| | | | | |
|---|---|---|---|---|
| 8,947,821 B1* | 2/2015 | Blinick | ............ | G11B 20/10009 360/65 |
| 2003/0095353 A1* | 5/2003 | Nakao | .................... | G11B 5/584 360/75 |
| 2006/0119969 A1* | 6/2006 | Hutchins | .................. | G11B 5/02 360/65 |
| 2011/0110210 A1* | 5/2011 | Honma | ............ | G11B 20/10009 369/47.15 |

* cited by examiner

MAGNETIC TAPE READING APPARATUS AND A MAGNETIC TAPE READING METHOD

CROSS-REFERENCE TO RELATED APPLICATIONS

This application claims priority under 35 USC 119 from Japanese Patent Application No. 2018-089371 filed May 7, 2018, and Japanese Patent Application No. 2018-098986 filed May 23, 2018, the disclosures of which are incorporated herein by reference in their entireties.

BACKGROUND

1. Technical Field

The present invention relates a magnetic tape reading apparatus and a magnetic tape reading method.

2. Related Art

U.S. Pat. No. 7,755,863B2 discloses a reading head in which a plurality of reading elements for a magnetic storage medium read a plurality of tracks at the same time from a storage medium by using a plurality of active regions.

JP2016-110680A discloses a magnetic head comprising a plurality of reproducing elements each including a first magnetic layer in which a magnetization direction is fixed, and a second magnetic layer which is provided to face the first magnetic layer with an insulating layer to be interposed therebetween and in which a magnetization direction is not fixed. In the magnetic head disclosed in JP2016-110680A, at least in two reproducing elements among the plurality of reproducing elements, the first magnetic layer and the second magnetic layer are disposed to across a certain straight line and magnetic directions of first magnetic bodies are different from each other.

JP2011-134372A discloses a magnetic signal reproducing apparatus comprising a reproducing head, a position deviation amount calculation unit, and an output value calculation unit. In the magnetic signal reproducing apparatus disclosed in JP2011-134372A, the reproducing head includes a plurality of reproducing elements disposed in a width direction of a track on a disk, and reproduces a burst signal recorded on each track with the plurality of reproducing elements positioned on the tracks. The reproducing head reproduces data signals recorded on each of a plurality of data tracks formed in a width direction of a first track with two or more reproducing elements positioned on the data tracks at the same time.

In the magnetic signal reproducing apparatus disclosed in JP2011-134372A, the position deviation amount calculation unit calculates a position deviation amount of a reproducing head with respect to the center of the track during the signal reproducing, from the burst signal recorded on the track. In the magnetic signal reproducing apparatus disclosed in JP2011-134372A, the output value calculation unit determines a positional relationship between two or more reproducing elements positioned on the data track and the data track, from a position error corresponding to the position deviation amount of the reproducing head. The output value calculation unit performs weighting composite of a data signal reproduced at the same time for each data track based on the determination result, and calculates an output value of the data track.

JP2008-282501A discloses a reproducing apparatus based on helical scan. In the reproducing apparatus disclosed in JP2008-282501A, a channel matrix estimation unit estimates a channel matrix variable in a section of a data, based on a plurality of channel matrixes obtained as a result of the channel estimation operation from a reproducing signal of a separation pattern in a plurality of preambles continuing with the data interposed therebetween. A signal separation operation unit separates a reproducing signal for each track from a reproducing signal for 1 unit, using the variable channel matrix estimated by the channel matrix estimation unit.

However, U.S. Pat. No. 7,755,863B2 does not disclose a specific activation method regarding the reading head. In addition, both technologies disclosed in JP2016-110680A and JP2011-134372A are technologies based on the reading of data from a disk medium, and a relative position between a plurality of reproducing elements and the track center is changed between an inner diameter portion and an outer diameter portion of the disk medium. Accordingly, it is difficult to dispose the plurality of the reproducing elements so as not to cause the deviation of each thereof with respect to all tracks. In addition, in the technology disclosed in JP2011-134372A, a servo pattern and data are written on the same track, and accordingly, it is difficult to properly read the data, in a case where sharp vibration occurs.

In addition, the technology disclosed in JP2008-282501A is based on helical scan, and it is difficult to synchronously perform the reading of a servo signal from a servo pattern and the reading of data from a reading target track as a linear scanning method.

However, in an example shown in FIG. 14, an elongated reading head 200 comprises a plurality of reading elements 202 along a longitudinal direction. In a magnetic tape 204, a plurality of tracks 206 are formed. The reading head 200 is disposed so that the longitudinal direction coincides with a width direction of the magnetic tape 204. In addition, each of the plurality of reading elements 202 is allocated for each of the plurality of tracks 206 in a one-to-one relation, and reads data from the track 206 at a position faced.

However, the magnetic tape 204 expands and contracts due to time elapse, an environment, a change of a tension, and the like. In a case where the magnetic tape expands and contracts in a width direction of the magnetic tape 204, the center of the reading element 202 disposed on both end in the longitudinal direction in the reading head 200 is deviated from the center of the track 206. In a case where the magnetic tape 204 is modified due to the expansion and contraction in a width direction, particularly, the reading elements 202 closer to both end of the reading head 200, among the plurality of reading elements 202, receive a greater effect of off-track. In order to reduce the effect of the off-track, for example, a method of applying a surplus width to the width of the track 206 has been considered, but as the width of the track 206 increases, a recording density of data in the magnetic tape 204 decreases.

In addition, as shown in FIG. 15 as an example, a servo element 208 is provided in the reading head 200. A servo pattern which is applied to the magnetic tape 204 in advance along a running direction of the magnetic tape 204 is read by the servo element 208. A control device (not shown) specifies that which position on the magnetic tape 204 the reading element 202 runs on, at regular time interval, from the servo signal obtained by reading the servo pattern by the servo element 208. Accordingly, a position error signal (PES) in a width direction of the magnetic tape 204 is detected by the control device.

As described above, in a case where the control device specifies the running position of the reading element 202, a feedback control is performed with respect to an actuator (not shown) for the reading head by the control device based on the specified running position, and accordingly, the tracking of the magnetic tape 204 in the width direction is realized.

However, although the tracking is performed, sharp vibration, a high-frequency component of jitter, and the like are factors of an increase in PES, and this causes a deterioration in reliability of data read from a reading target track.

SUMMARY

An object of one embodiment of the present invention is to provide a magnetic tape reading apparatus and a magnetic tape reading method capable of preventing a deterioration in reliability of data read from a reading target track by a linear scanning method, compared to a case where data is read only by a single reading element from a reading target track by a linear scanning method.

In order to achieve the object described above, a magnetic tape reading apparatus according to a first aspect of the present invention comprises: a reading element unit which includes a plurality of reading elements which are disposed in a state of being adjacent to each other and each of which reads data by a linear scanning method from a specific track region including a reading target track in a track region included in a magnetic tape; and an extraction unit which performs a waveform equalization process according to a deviation amount between positions of the magnetic tape and the reading element unit, with respect to each reading result for each reading element, to extract data derived from the reading target track from the reading result. Therefore, in the magnetic tape reading apparatus according to the first aspect of the present invention, it is possible to prevent a deterioration in reliability of data read from the reading target track by the linear scanning method, compared to a case where the data is read from the reading target track only by a single reading element by the linear scanning method.

In the magnetic tape reading apparatus according to a second aspect of the present invention, parts of the plurality of reading elements are overlapped each other in a running direction of the magnetic tape. Therefore, in the magnetic tape reading apparatus according to the second aspect of the present invention, it is possible to possible to increase reliability of data read from the reading target track by the linear scanning method, compared to a case where the entire portions of the plurality of reading elements are overlapped on each other in the running direction of the magnetic tape.

In the magnetic tape reading apparatus according to a third aspect of the present invention, the specific track region is a region including the reading target track and adjacent tracks which are adjacent to the reading target track, and each of the plurality of reading elements straddles over both of the reading target track and the adjacent track, in a case where a positional relationship with the magnetic tape is changed. Therefore, in the magnetic tape reading apparatus according to the third aspect of the present invention, it is possible to reduce the noise component generated due to entering of one reading element into the adjacent track from the reading target track in the width direction of the magnetic tape, by using the reading result obtained by the other reading element entering the adjacent track from the reading target track in the width direction of the magnetic tape, compared to a case where the data is read by only the single reading element from the reading target track.

In the magnetic tape reading apparatus according to a fourth aspect of the present invention, the plurality of reading elements are disposed in a line in a state of being adjacent to each other, in a width direction of the magnetic tape. Therefore, in the magnetic tape reading apparatus according to the fourth aspect of the present invention, it is possible to read data from a region of the reading target track having a wide width by the linear scanning method, compared to a case where the data is read by only the single reading element from the reading target track by the linear scanning method.

In the magnetic tape reading apparatus according to a fifth aspect of the present invention, the plurality of reading elements fall in the reading target track in the width direction of the magnetic tape. Therefore, in the magnetic tape reading apparatus according to the fifth aspect of the present invention, the noise component from the track adjacent to the reading target track is hardly mixed into data read by the plurality of reading elements by the linear scanning method, compared to a case where the plurality of reading elements are protruded from the reading target track in the width direction of the magnetic tape.

In the magnetic tape reading apparatus according to a sixth aspect of the present invention, a tap coefficient used in the waveform equalization process is determined in accordance with the deviation amount. Therefore, in the magnetic tape reading apparatus according to the sixth aspect of the present invention, it is possible to instantaneously reduce the noise component generated due to the entering the reading target track from the adjacent track in the width direction of the magnetic tape, in accordance with a change of the positional relationship between the magnetic tape and the reading element unit, compared to a case where the tap coefficient is determined in accordance with a parameter with no relation with the deviation amount.

In the magnetic tape reading apparatus according to a seventh aspect of the present invention, regarding each of the plurality of reading elements, a ratio between an overlapping region with the reading target track and an overlapping region with the adjacent track which is adjacent to the reading target track is specified from the deviation amount, and the tap coefficient is determined in accordance with the specified ratio. Therefore, in the magnetic tape reading apparatus according to the seventh aspect of the present invention, it is possible to exactly reduce the noise component, even in a case where the positional relationship between the magnetic tape and the reading element unit is changed, compared to a case where the tap coefficient is determined in accordance with a parameter with no relation with a ratio between the overlapping region with the reading target track and the overlapping region with the adjacent track regarding each of the plurality of reading elements.

In the magnetic tape reading apparatus according to an eighth aspect of the present invention, the deviation amount is determined in accordance with a result obtained by reading a servo pattern applied to the magnetic tape in advance, by a servo element. Therefore, in the magnetic tape reading apparatus according to the eighth aspect of the present invention, it is possible to easily determine the deviation amount, compared to a case where the servo patterns are not applied to the magnetic tape.

In the magnetic tape reading apparatus according to a ninth aspect of the present invention, the reading operation by the reading element unit is performed synchronously with the reading operation by the servo element. Therefore, in the magnetic tape reading apparatus according to the ninth aspect of the present invention, it is possible to instantaneously reduce the noise component generated due to the entering the reading target track from the adjacent track in the width direction of the magnetic tape, compared to a case of a magnetic disk in which a servo pattern and data cannot be synchronously read.

In the magnetic tape reading apparatus according to a tenth aspect of the present invention, the extraction unit includes a two-dimensional FIR filter, and the two-dimensional FIR filter composes each result obtained by performing the waveform equalization process with respect to each reading result for each reading element, to extract data derived from the reading target track from the reading result. Therefore, in the magnetic tape reading apparatus according to the tenth aspect of the present invention, it is possible to rapidly extract the data derived from the reading target track from the reading result, compared to a case of using only a one-dimensional FIR filter.

In the magnetic tape reading apparatus according to an eleventh aspect of the present invention, the plurality of reading elements are a pair of reading elements. Therefore, in the magnetic tape reading apparatus according to the eleventh aspect of the present invention, it is possible to contribute to miniaturization of the reading element unit, compared to a case of using three reading elements.

In order to achieve the object described above, a magnetic tape reading apparatus according to a twelfth aspect of the present invention comprises: a plurality of reading element units each of which includes a plurality of reading elements which are disposed in a state of being adjacent to each other and each of which reads data by a linear scanning method from each of a plurality of specific track regions including each of reading target tracks in a track region included in a magnetic tape; and an extraction unit which performs a waveform equalization process according to a deviation amount between positions of the magnetic tape and the reading element unit, with respect to each reading result for each reading element, regarding each of the plurality of reading element units, to extract data derived from the reading target track from the reading result. Therefore, in the magnetic tape reading apparatus according to the twelfth aspect of the present invention, it is possible prevent a deterioration in reliability of data read from the reading target track by the linear scanning method, compared to a case where data is read only by a single reading element from a reading target track by a linear scanning method.

In order to achieve the object described above, a magnetic tape reading method according to a thirteenth aspect of the present invention comprises: disposing a reading element unit including a plurality of reading elements in a state where the plurality of reading elements are adjacent to each other; causing the plurality of reading elements to read data by a linear scanning method from a specific track region including a reading target track in a track region included in a magnetic tape; and causing an extraction unit to perform a waveform equalization process according to a deviation amount between positions of the magnetic tape and the reading element unit, with respect to each reading result for each reading element, to extract data derived from the reading target track from the reading result.

According to one embodiment of the present invention, an effect capable of preventing a deterioration in reliability of data read from a reading target track by a linear scanning method is obtained, compared to a case where data is read only by a single reading element from a reading target track by a linear scanning method.

BRIEF DESCRIPTION OF THE DRAWINGS

Exemplary embodiments of the present invention will be described in detail based on the following figures, wherein.

DETAILED DESCRIPTION

Hereinafter, an example of the embodiment of a magnetic tape reading apparatus according to a technology of this disclosure will be described with reference to the accompanying drawings.

Figure 1:
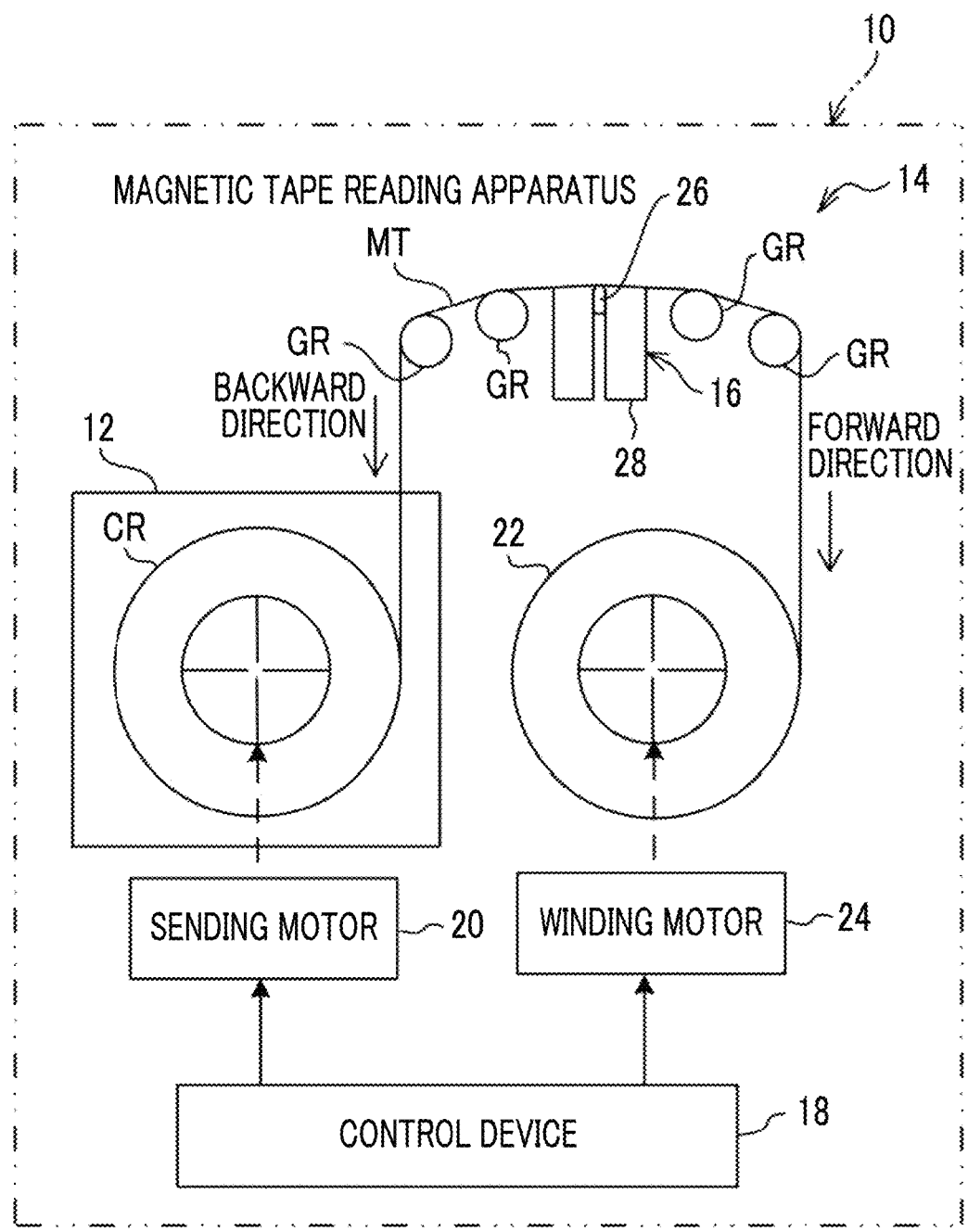
FIG. 1 is a schematic configuration view showing an example of the entire configuration of a magnetic tape reading apparatus according to the embodiment.

As an example shown in FIG. 1, a magnetic tape reading apparatus 10 comprises a magnetic tape cartridge 12, a transportation device 14, a reading head 16, and a control device 18.

The magnetic tape reading apparatus 10 is an apparatus which extracts a magnetic tape MT from the magnetic tape cartridge 12 and reads data from the extracted magnetic tape MT by using the reading head 16 by a linear scanning method. In the embodiment of the present disclosure, the reading of data indicates the reproducing of data.

The control device 18 controls the entire magnetic tape reading apparatus 10. In the embodiment of the present disclosure, the control device 18 is realized with an application specific integrated circuit (ASIC), but the technology of the present disclosure is not limited thereto. For example, the control device 18 may be realized with a field-programmable gate array (FPGA). In addition, the control device 18 may be realized with a computer including a central processing unit (CPU), a read only memory (ROM), and a random access memory (RAM). Further, the control device may be realized with a combination of two or more of AISC, FPGA, and the computer.

The transportation device 14 is a device which selectively transports the magnetic tape MT in a forward direction and a backward direction, and comprises a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. The rotation rate, the rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension in which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In the embodiment of the present disclosure, the tension of the magnetic tape MT is controlled by controlling the rotation rate, the rotation torque, and the like of the sending motor 20 and the winding motor 24, but the technology of the present disclosure is not limited thereto. For example, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by separately disposing the plurality of guide rollers GR on positions crossing the reading head 16 between the magnetic tape cartridge 12 and the winding reel 22.

The reading head 16 comprises a reading unit 26 and a holder 28. The reading unit 26 is held by the holder 28 so as to come into contact with the magnetic tape MT during the running.

Figure 2:
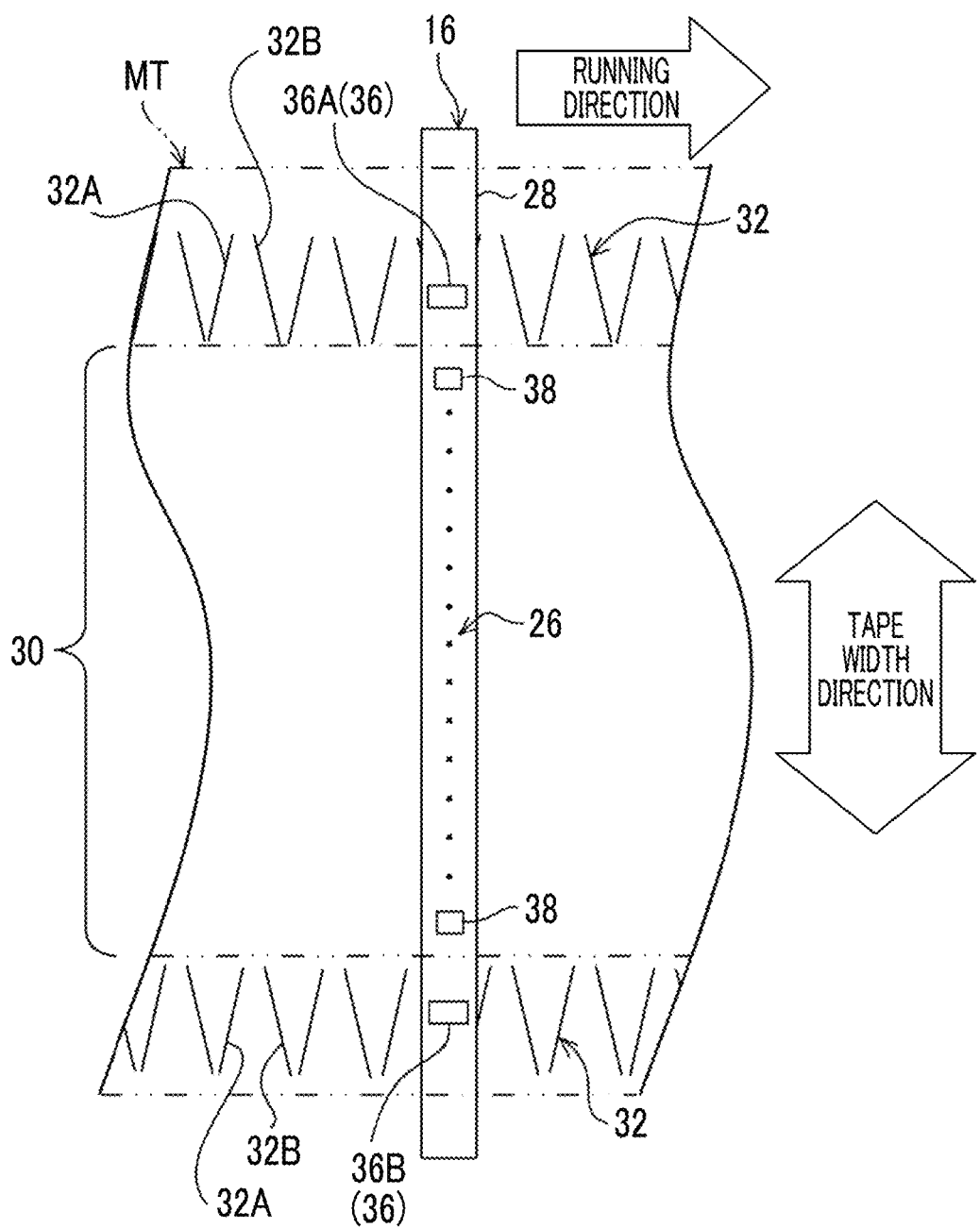
FIG. 2 is a schematic plan view showing an example of a schematic configuration in a plan view of a reading head and a magnetic tape included in the magnetic tape reading apparatus according to the embodiment.

As an example shown in FIG. 2, the magnetic tape MT comprises a track region 30 and a servo pattern 32. The servo pattern 32 is a pattern used for detection of the position of the reading head 16 on the magnetic tape MT. The servo pattern 32 is a pattern in which a first diagonal line 32A at a first predetermined angle (for example, 95 degrees) and a second diagonal line 32B at a second predetermined angle (for example, 85 degrees) are alternately disposed on both ends in a tape width direction at a constant pitch along a running direction of the magnetic tape MT. The "tape width direction" here indicates a width direction of the magnetic tape MT.

The track region 30 is a region where the data which is a reading target is read, and is formed on the center of the magnetic tape MT in the tape width direction. The "center in the tape width direction" here indicates, for example, a region between the servo pattern 32 on one end and the servo pattern 32 on the other end of the magnetic tape MT in the tape width direction. Hereinafter, for convenience of description, the "running direction of the magnetic tape MT" is simply referred to as the "running direction".

The reading unit 26 comprises a servo element pair 36 and a plurality of reading element units 38. The holder 28 is formed to be elongated in the tape width direction, and a total length of the holder 28 in the longitudinal direction is longer than the width of the magnetic tape MT. The servo element pair 36 are disposed on both ends of the holder 28 in the longitudinal direction, and the plurality of reading element units 38 are disposed on the center of the holder 28 in the longitudinal direction.

The servo element pair 36 comprises servo elements 36A and 36B. The servo element 36A is disposed on a position facing the servo pattern 32 on one end of the magnetic tape MT in the tape width direction, and the servo element 36B is disposed on a position facing the servo pattern 32 on the other end of the magnetic tape MT in the tape width direction.

In the holder 28, the plurality of reading element units 38 are disposed between the servo element 36A and the servo element 36B along the tape width direction. The track region 30 comprises the plurality of tracks at regular interval in the tape width direction, and in a default state of the magnetic tape reading apparatus 10, each of the plurality of reading element units 38 is disposed to face each track in the track region 30.

Thus, since the reading unit 26 and the magnetic tape MT relatively move linearly along the longitudinal direction of the magnetic tape MT, the data of each track in the track region 30 is read by each reading element unit 38 at the corresponding position among the plurality of reading element units 38 by the linear scanning method. In addition, in the linear scanning method, the servo patterns 32 are read by the servo element pair 36 synchronously with the reading operation of the reading element units 38. That is, in the linear scanning method according to the embodiment of the present disclosure, the reading with respect to the magnetic tape MT is performed in parallel by the plurality of reading element units 38 and the servo element pair 36.

Here, "each track in the track region 30" here indicates a track included in "each of a plurality of specific track region including each reading target track in the track region included in the magnetic tape" in the present disclosure.

The default state of the magnetic tape reading apparatus 10 indicates a state where the magnetic tape MT is not deformed and a positional relationship between the magnetic tape MT head the reading head 16 is a correct positional relationship. Here, the correct positional relationship indicates a positional relationship in which the center of the magnetic tape MT in the tape width direction and the center of the reading head 16 in the longitudinal direction coincide with each other.

Since each of the plurality of reading element unit 38 has the same configuration, the description will be performed using one of the plurality of reading element unit 38 as an example, hereinafter, for convenience of description. As an example shown in FIG. 3, the reading element unit 38 comprises one pair of reading elements. In the example shown in FIG. 3, one pair of reading elements indicate a first reading element 40 and a second reading element 42. Each of the first reading element 40 and the second reading element 42 reads data from a specific track region 31 including a reading target track 30A in the track region 30.

Figure 3:
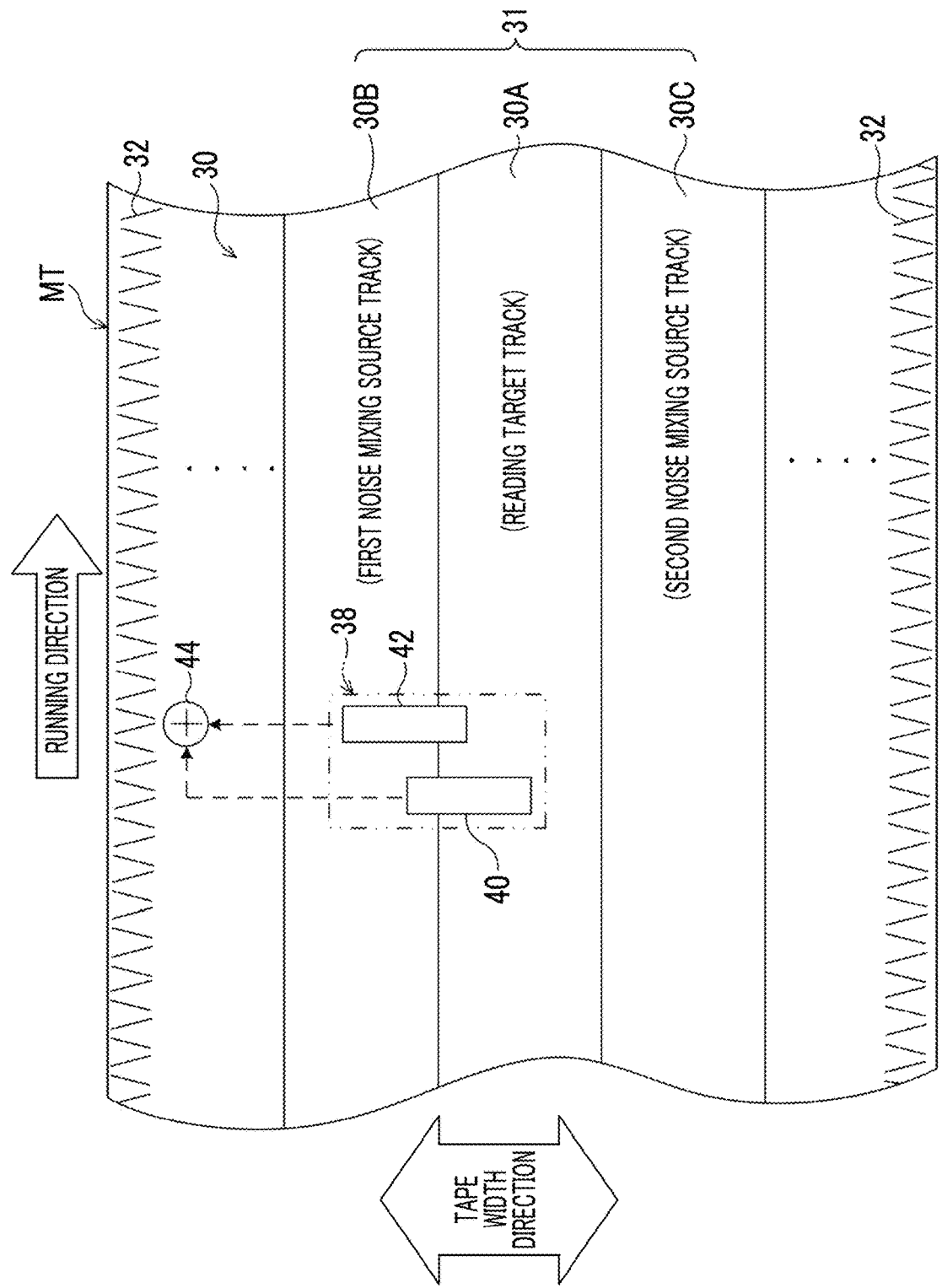
FIG. 3 is a schematic plan view showing an example of a schematic configuration in a plan view of a reading element unit and a magnetic tape according to the embodiment.

In the example shown in FIG. 3, for convenience of description, one specific track region 31 is shown, but in practice, in the track region 30, a plurality of specific track regions 31 are present, and the reading target track 30A is included in each specific track region 31. The reading element unit 38 is allocated to each of the plurality of specific track regions 31 in a one-to-one manner. Specifically, the reading element unit 38 is allocated to the reading target track 30A in each of the plurality of specific track regions 31 in a one-to-one manner.

The specific track region 31 indicates three adjacent tracks. A first track among the three adjacent tracks is the reading target track 30A in the track region 30. A second track among the three adjacent tracks is a first noise mixing source track 30B which is one adjacent track adjacent to the reading target track 30A. A third track among the three adjacent tracks is a second noise mixing source track 30C which is one adjacent track adjacent to the reading target track 30A. The reading target track 30A is a track at a position facing the reading element unit 38 in the track region 30. That is, the reading target track 30A indicates a track having data to be read by the reading element unit 38.

The first noise mixing source track 30B is a track which is adjacent to the reading target track 30A on one side in the tape width direction and is a mixing source of noise mixed to data read from the reading target track 30A. The second noise mixing source track 30C is a track which is adjacent to the reading target track 30A on the other side in the tape width direction and is a mixing source of noise mixed to data read from the reading target track 30A. Hereinafter, for convenience of description, in a case where it is not necessary to describe the first noise mixing source track 30B and the second noise mixing source track 30C separately, these are referred to as the "adjacent track" without reference numerals.

In the embodiment of the present disclosure, in the track region 30, the plurality of specific track regions 31 are disposed at regular interval in the tape width direction. For example, in the track region 30, 32 specific track regions 31 are disposed at regular interval in the tape width direction, and the reading element unit 38 is allocated to each specific track region 31 in a one-to-one manner.

The first reading element 40 and the second reading element 42 are disposed at positions a part of which is overlapped in the running direction, in a state of being adjacent in the running direction. In a default state of the magnetic tape reading apparatus 10, the first reading element 40 is disposed at a position straddling over the reading target track 30A and the first noise mixing source track 30B. In a default state of the magnetic tape reading apparatus 10, the second reading element 42 is disposed at a position straddling over the reading target track 30A and the first noise mixing source track 30B.

In a default state of the magnetic tape reading apparatus 10, the area of a portion of the first reading element 40 facing the reading target track 30A is greater than the area of a portion of the first reading element 40 facing the first noise mixing source track 30B, in a plan view. Meanwhile, in a default state of the magnetic tape reading apparatus 10, the area of a portion of the second reading element 42 facing the first noise mixing source track 30B is greater than the area of a portion of the first reading element 40 facing the reading target track 30A, in a plan view.

Figure 7:
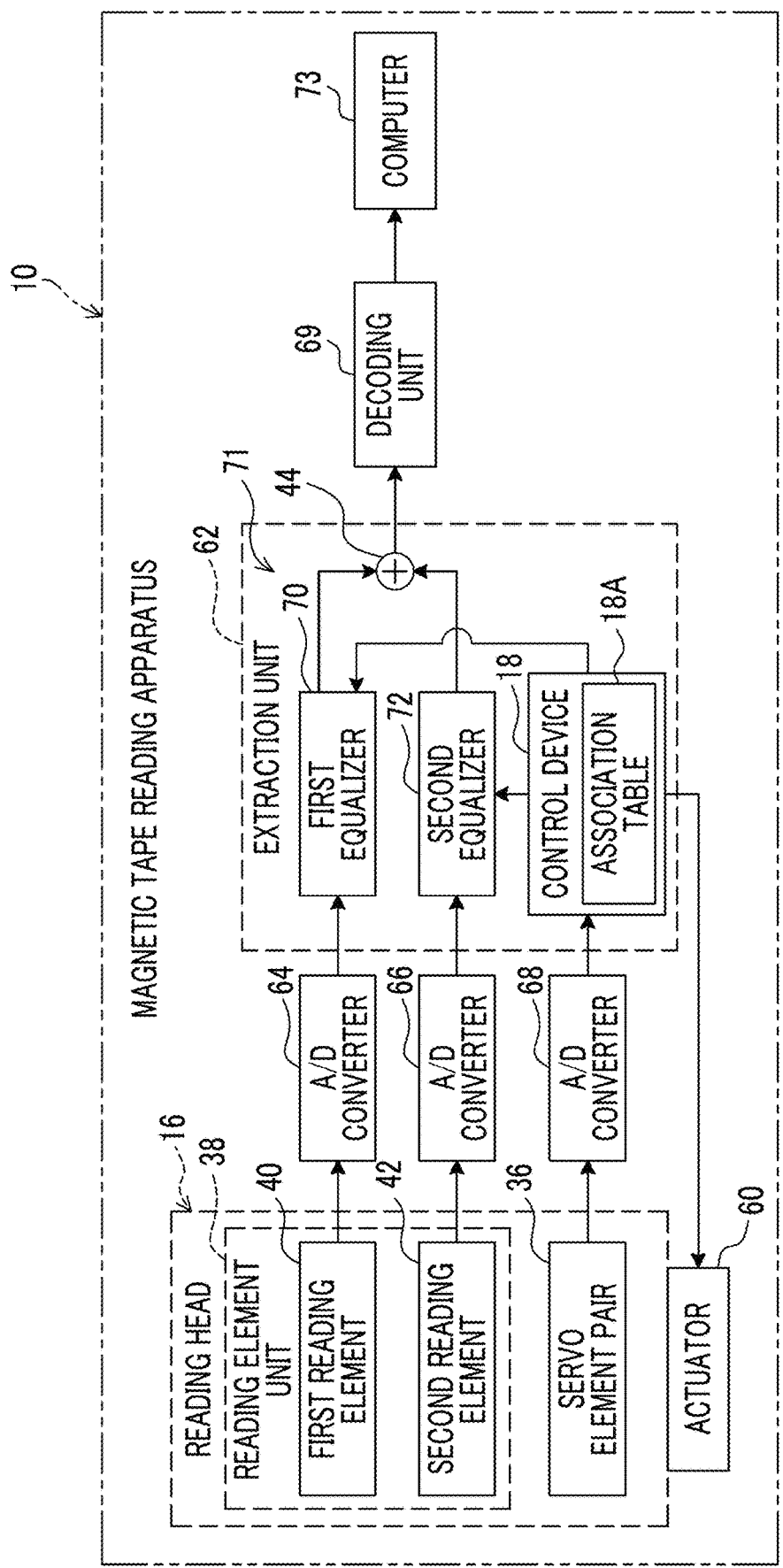
FIG. 7 is a block view showing an example of a main configuration of hardware of an electric system of the magnetic tape reading apparatus according to the embodiment.

The data read by the first reading element 40 is subjected to a waveform equalization process by a first equalizer 70 (see FIG. 7). The data read by the second reading element 42 is subjected to a waveform equalization process by a second equalizer 72 (see FIG. 7). Each data item obtained by performing the waveform equalization process by each of the first equalizer 70 and the second equalizer 72 is added by an adder 44 and composed.

In the embodiment of the present disclosure, the aspect in which the reading element unit 38 includes the first reading element 40 and the second reading element 42 has been described, but for example, even in a case where only one reading element (hereinafter, also referred to as a single reading element) among a pair of reading elements may be used, a signal corresponding to a reproducing signal obtained from the reading element unit 38 is obtained.

Figure 8:
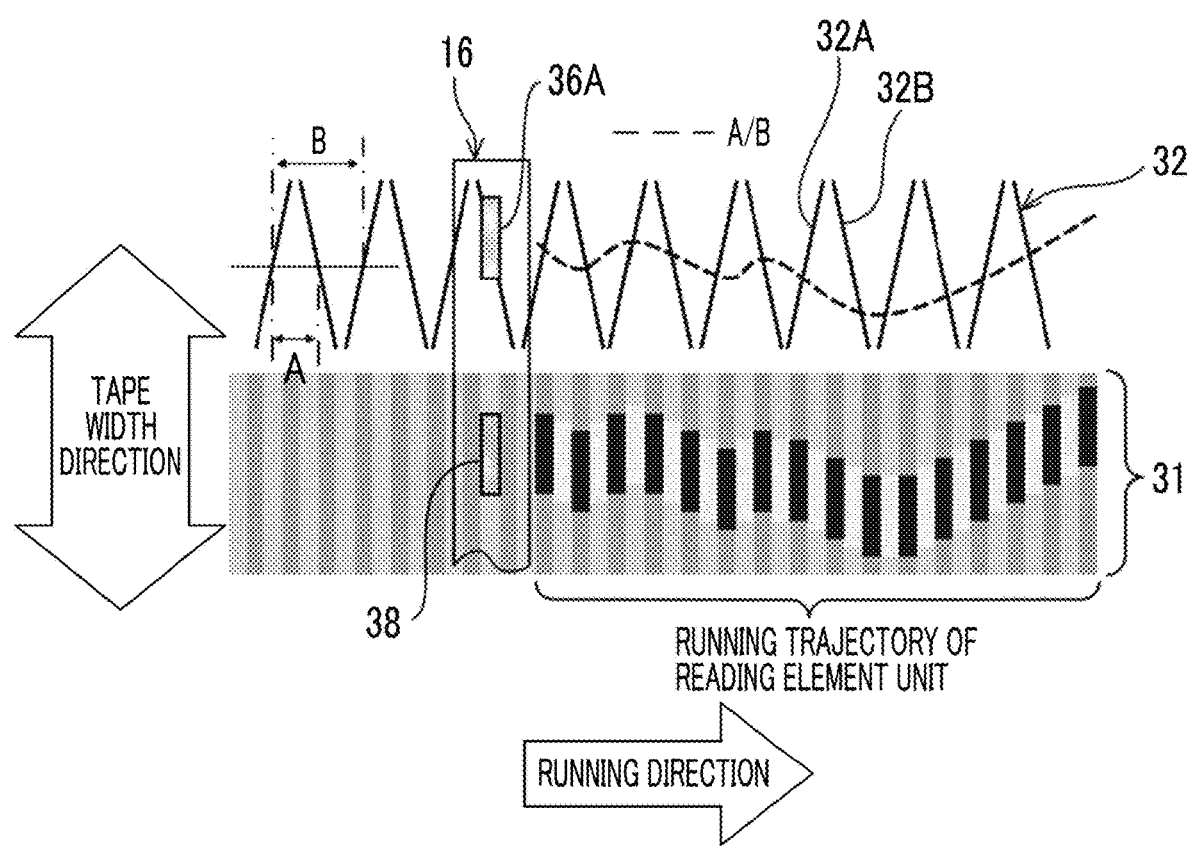
FIG. 8 is a conceptual view provided for description of a method of calculating a deviation amount.

In this case, for example shown in FIG. 8, the reproducing signal obtained from the single reading element is allocated to a plane position on a track calculated from a servo signal obtained by the servo element pair 36 synchronously with the reproducing signal. By repeating this operation while moving the single reading element in the tape width direction, a two-dimensional image of the reproducing signal (hereinafter, simply referred to as a "two-dimensional image") is obtained. Here, a reproducing signal configuring the two-dimensional image or a part of the two-dimensional image (for example, reproducing signal corresponding to the position of the plurality of tracks) is signal corresponding to the reproducing signal obtained from the reading element unit 38.

Figure 16:
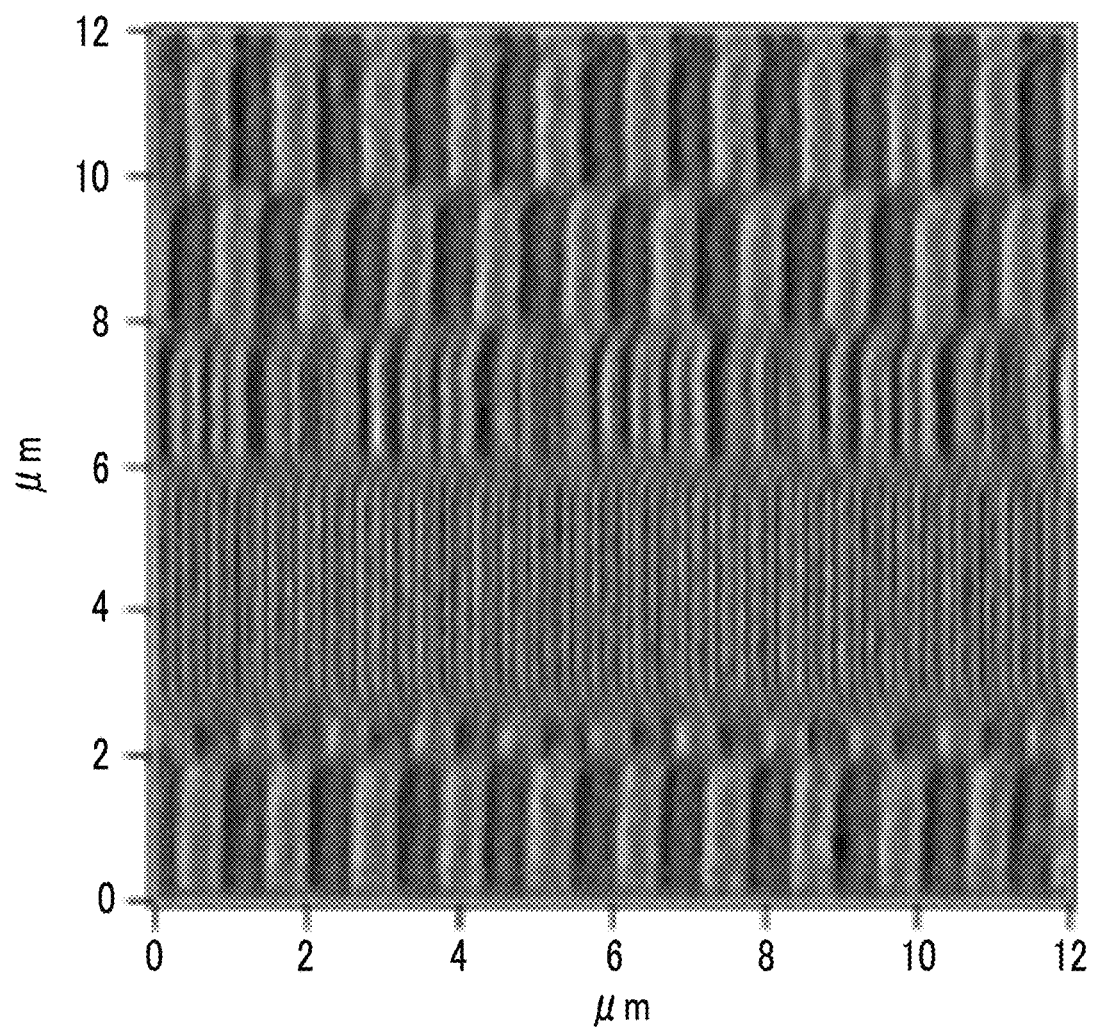
FIG. 16 is a view showing an example of a two-dimensional image of a reproducing signal obtained from a single reading element.

FIG. 16 shows an example of a two-dimensional image of the reproducing signal of the magnetic tape MT in a loop shape (hereinafter, also referred to as a "loop tape") obtained by using a loop tester. Here, the loop tester indicates a device which transports the loop tape in a state where the loop tape is repeatedly in contact with the single reading element, for example. In order to obtain a two-dimensional image in the same manner as in the case of the loop tester, a reel tester may be used or an actual tape drive may be used. The "reel tester" here indicates a device which transports the magnetic tape MT in a reel state, for example.

As described above, even in a case where a head for a magnetic tape of the related art which does not include the reading element unit on which the plurality of reading elements are loaded at adjacent positions is used, the effect according to the technology of the present disclosure can be quantitatively evaluated. As an example of an index for quantitatively evaluating the effect according to the technology of the present disclosure, a signal-to-noise ratio (SNR), an error rate, and the like are used.

Figure 4:
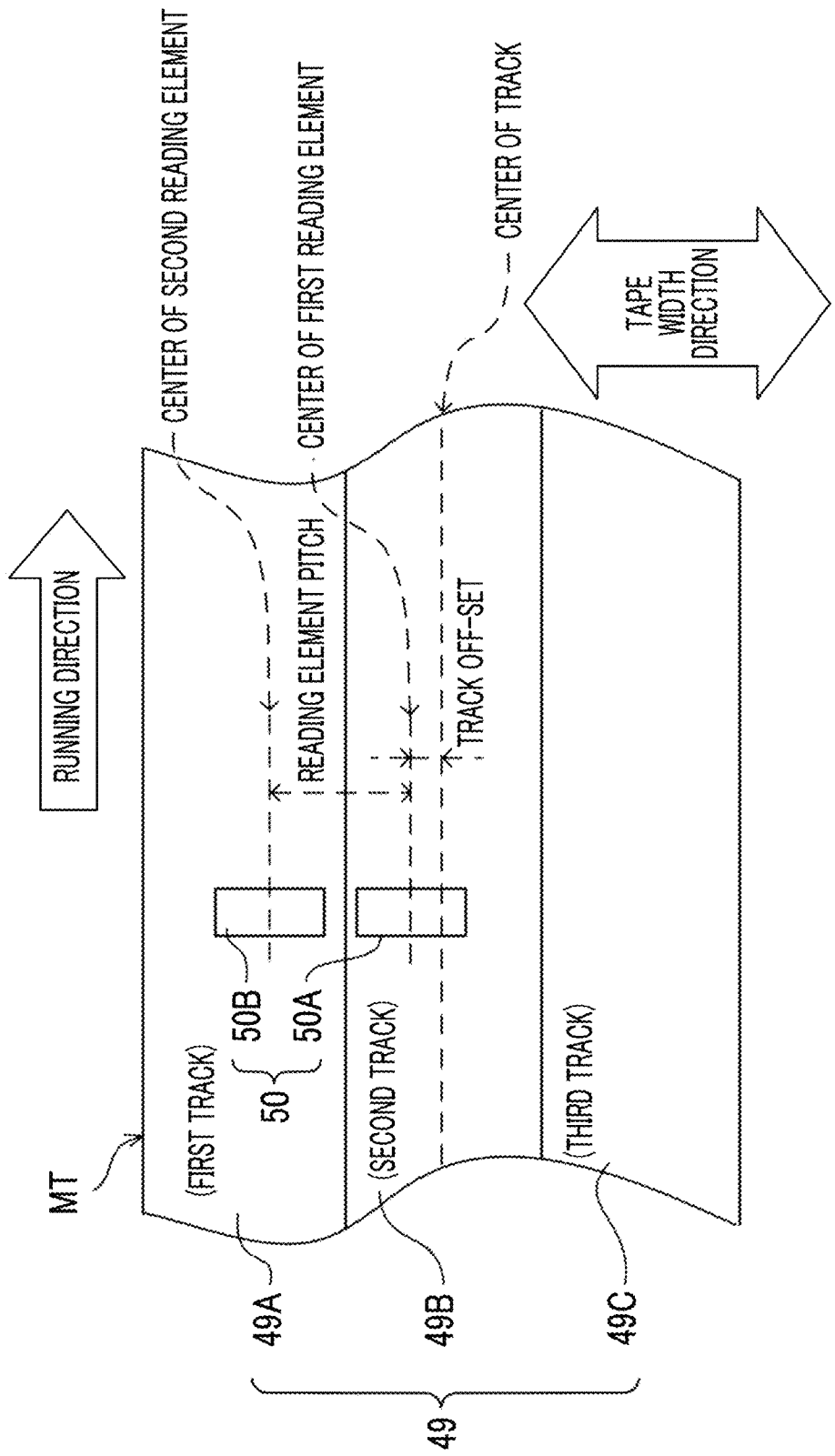
FIG. 4 is a schematic plan view showing an example of a schematic configuration in a plan view of a track region and a reading element pair.
Figure 5:
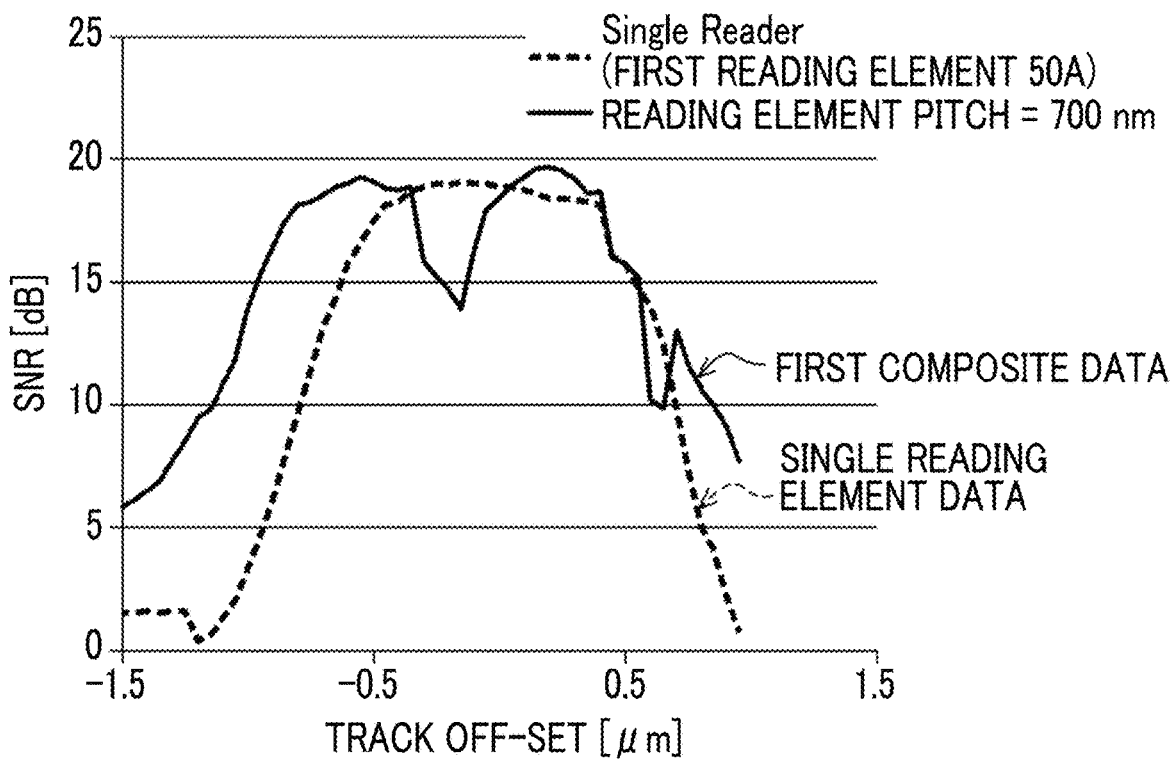
FIG. 5 is a graph showing an example of a correlation between an SNR regarding each of a single reading element data item and a first composite data item under a first condition, and track off-set.
Figure 6:
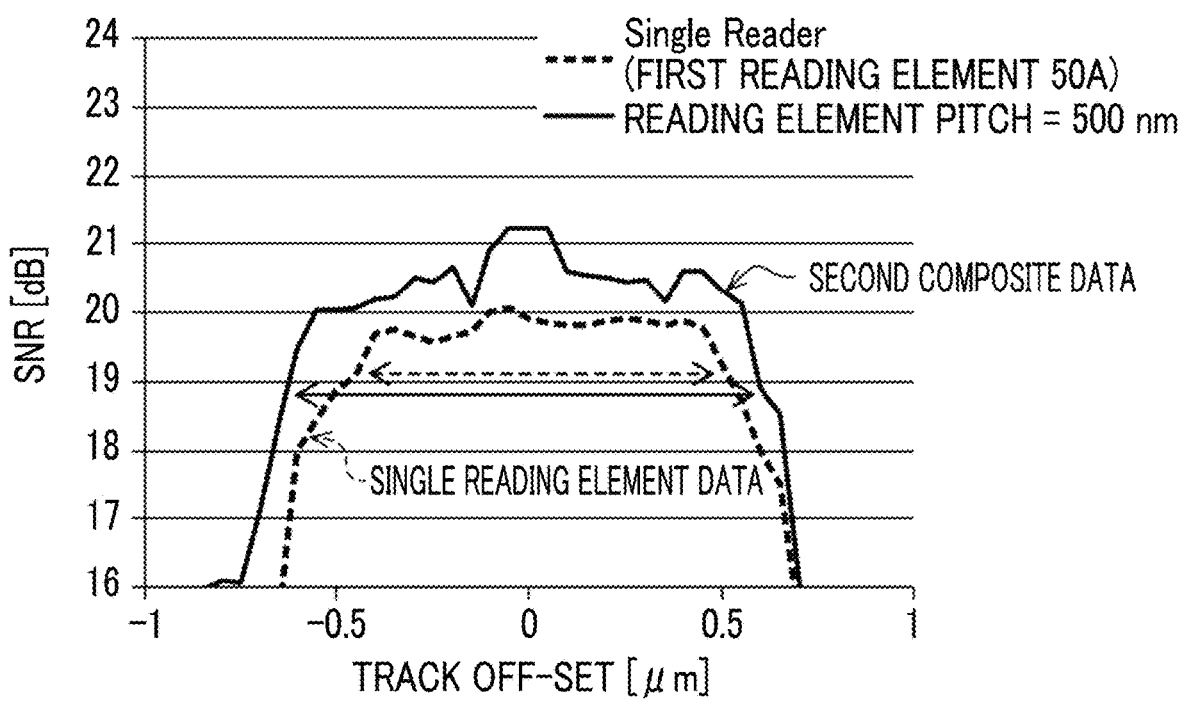
FIG. 6 is a graph showing an example of a correlation between an SNR regarding each of the single reading element data item and a second composite data item under a second condition, and track off-set.

FIGS. 4 to 6 show results obtained from experiments performed by the present inventors. As an example shown in FIG. 4, a reading element pair 50 are disposed on a track region 49. The track region 49 is a first track 49A, a second track 49B, and a third track 49C adjacent to each other in the tape width direction. The reading element pair 50 are a first reading element 50A and a second reading element 50B. The first reading element 50A and the second reading element 50B are disposed at positions adjacent to each other in the tape width direction. The first reading element 50A is disposed so as to face the second track 49B which is the reading target track and fall in the second track 49B. In addition, the second reading element 50B is disposed so as to face the first track 49A adjacent to one side of the second track 49B and fall in the first track 49A.

FIG. 5 shows an example of a correlation between a signal-to-noise ratio (SNR) regarding each of a single reading element data item and a first composite data item under a first condition, and track off-set. In addition, FIG. 6 shows an example of a correlation between an SNR regarding each of the single reading element data item and a second composite data item under a second condition, and track off-set.

Here, the single reading element data indicates data obtained by performing a waveform equalization process with respect to data read by the first reading element 50A, in the same manner as in the case of the first reading element 40 shown in FIG. 3. The first condition indicates a condition in which a reading element pitch is 700 nm (nanometers). The second condition indicates a condition in which a reading element pitch is 500 nm. The reading element pitch indicates a pitch of the first reading element 50A and the second reading element 50B in the tape width direction, as shown in FIG. 4 as an example. The track off-set indicates a deviation amount between the center of the second track 49B in the tape width direction and the center of the first reading element 50A in the track width direction, as an example shown in FIG. 4.

The first composite data indicates data composed by adding a first waveform equalized data item and a second waveform equalized data item obtained under the first condition. The first waveform equalized data item indicates data obtained by performing the waveform equalization process with respect to the data read by the first reading element 50A, in the same manner as in the case of the first reading element 40 shown in FIG. 3. The second waveform equalized data item indicates data obtained by performing the waveform equalization process with respect to the data read by the second reading element 50B, in the same manner as in the case of the second reading element 42 shown in FIG. 3. The second composite data indicates data composed by adding a first waveform equalized data item and a second waveform equalized data item obtained under the second condition.

In a case of comparing the SNR of the first composite data shown in FIG. 5 to the SNR of the second composite data shown in FIG. 6, the SNR of the first composite data rapidly declines to generate a groove of the graph, in a case where the track off-set is −0.4 μm (micrometers) to 0.2 μm, whereas the SNR of the second composite data does not rapidly decline as the graph of the SNR of the first composite data. Each of the SNR of the first composite data and the SNR of the second composite data is higher than the SNR of the single reading element data, and particularly, the SNR of the second composite data is higher than the SNR of the single reading element data over the entire range of the track off-set.

From the experimental results shown in FIGS. 5 and 6, the present inventors have found that it is preferable to perform the reading of data in a state where the first reading element 50A and the second reading element 50B are adjacent to each other in the tape width direction, compared to a case where the reading of data is performed by only the first reading element 50A. The "state adjacent to each other" here means that the first reading element 50A and the second reading element 50B are not in contact with each other, but are disposed in a line in the tape width direction, so that the SNR becomes higher than the SNR of the single reading element data, over the entire range of the track off-set.

In the embodiment of the present disclosure, as an example shown in FIG. 3, in the reading element unit 38, parts of the first reading element 40 and the second reading element 42 are overlapped each other in the running direction, and accordingly, a high density of the tracks included in the magnetic tape MT is realized.

As shown in FIG. 7 as an example, the magnetic tape reading apparatus 10 comprises an actuator 60, an extraction unit 62, an analog/digital (A/D) converters 64, 66, and 68, a decoding unit 69, and a computer 73.

The control device 18 is connected to the servo element pair 36 through the A/D converter 68. The A/D converter 68 outputs a servo signal obtained by converting an analog signal obtained by reading the servo pattern 32 by the servo elements 36A and 36B included in the servo element pairs 36 into a digital signal, to the control device 18.

The control device 18 is connected to the actuator 60. The actuator 60 is attached to the reading head 16 and applies electric power to the reading head 16 under the control of the control device 18, to change the position of the reading head 16 in the tape width direction. The actuator 60, for example, includes a voice coil motor, and the electric power applied to the reading head 16 is electric power obtained by converting an electric energy based on a current flowing through the coil into a kinetic energy, using an energy of a magnet as a medium.

Here, the aspect in which the voice coil motor is loaded on the actuator 60 has been described, but the technology of the present disclosure is not limited thereto, and for example, a piezoelectric element can also be used, instead of the voice coil motor. In addition, the voice coil motor and the piezoelectric element can be combined with each other.

The deviation amount of the positions of the magnetic tape MT and the reading element unit 38 is determined in accordance with a servo signal which is a result obtained by reading the servo patterns 32 by the servo element pair 36. The control device 18 controls the actuator 60 to apply the electric power according to the deviation amount of the positions of the magnetic tape MT and the reading element unit 38 to the reading head 16. Accordingly, the position of the reading head 16 is fluctuated in the tape width direction and the position of the reading head 16 is adjusted to a normal position. Here, for example shown in FIG. 3, the normal position indicates a position of the reading head 16 in a default state of the magnetic tape reading apparatus 10.

Here, the deviation amount of the positions of the magnetic tape MT and the reading element unit 38 is used as an example, the technology of the present disclosure is not limited thereto. For example, the deviation amount of predetermined reference positions of the servo element 36A and the magnetic tape MT may be used, or the deviation amount of an end surface of the reading head 16 and a center position of a specific track included in the magnetic tape MT may be used. As described above, the deviation amount corresponding to the deviation amount between the center of the reading target track 30A in the tape width direction and the center of the reading head 16 in the tape width direction may be used. Hereinafter, for convenience of description, the deviation amount of the positions of the magnetic tape MT and the reading element unit 38 is simply referred to as a "deviation amount".

For example shown in FIG. 8, the deviation amount is calculated based on a ratio of a distance A to a distance B. The distance A indicates a distance calculated from a result obtained by reading the first diagonal line 32A and the second diagonal line 32B adjacent to each other by the servo element 36A. The distance B indicates a distance calculated from a result obtained by reading the two first diagonal lines 32A adjacent to each other by the servo element 36A.

The extraction unit 62 comprises the control device 18 and a two-dimensional finite impulse response (FIR) filter 71. The two-dimensional FIR filter 71 comprises the adder 44, the first equalizer 70, and the second equalizer 72.

The first equalizer 70 is connected to the first reading element 40 through the A/D converter 64. In addition, the first equalizer 70 is connected to each of the control device 18 and the adder 44. The data read by the first reading element 40 from the specific track region 31 is an analog signal, and the A/D converter 64 outputs a first reading signal obtained by converting the data read by the first reading element 40 from the specific track region 31 into a digital signal, to the first equalizer 70.

The second equalizer 72 is connected to the second reading element 42 through the A/D converter 66. In addition, the second equalizer 72 is connected to each of the control device 18 and the adder 44. The data read by the second reading element 42 from the specific track region 31 is an analog signal, and the A/D converter 66 outputs a second reading signal obtained by converting the data read by the second reading element 42 from the specific track region 31 into a digital signal, to the second equalizer 72. The first reading signal and the second reading signal are one example of a "reading result for each reading element" according to the technology of the present disclosure.

The first equalizer 70 performs the waveform equalization process with respect to the input first reading signal. That is, the first equalizer 70 performs a convolution arithmetic operation of a tap coefficient with respect to the input first reading signal, and outputs the first arithmetic operation processed signal which is a signal after the arithmetic operation.

The second equalizer 72 performs the waveform equalization process with respect to the input second reading signal. That is, the second equalizer 72 performs a convolution arithmetic operation of a tap coefficient with respect to the input second reading signal, and outputs the second arithmetic operation processed signal which is a signal after the arithmetic operation.

Each of the first equalizer 70 and the second equalizer 72 outputs the first arithmetic operation processed signal and the second arithmetic operation processed signal to the adder 44. The adder 44 adds and composes the first arithmetic operation processed signal input from the first equalizer 70 and the second arithmetic operation processed signal input from the second equalizer 72, and outputs the composite data obtained by the composite to the decoding unit 69.

Each of the first equalizer 70 and the second equalizer 72 is a one-dimensional FIR filter.

In the embodiment of the present disclosure, the FIR filter is a series of actual values including positive and negative values, the number of lines of the series is referred to as a tap number, and the numerical value is referred to as a tap coefficient. In addition, in the embodiment of the present disclosure, the waveform equalization indicates a process of the convolution arithmetic operation of the series of actual values, that is, the tap coefficient, with respect to the reading signal. The "reading signal" here indicates a collective term of the first reading signal and the second reading signal. In the embodiment of the present disclosure, the equalizer indicates a circuit which carries out a process of performing the convolution arithmetic operation of the tap coefficient with respect to the reading signal or the other input signal and outputting the signal after the arithmetic operation. In addition, in the embodiment of the present disclosure, the adder indicates a circuit which simply adds two series. The weighting of the two series is reflected on the numerical values, that is, the tap coefficient of the FIR filter used in the first equalizer 70 and the second equalizer 72.

The control device 18 performs the waveform equalization process according to the deviation amount with respect to each of the first equalizer 70 and the second equalizer 72 by setting the tap coefficient according to the deviation amount with respect to the FIR filter of each of the first equalizer 70 and the second equalizer 72.

The control device 18 comprises an association table 18A. The association table 18A associates the tap coefficient with the deviation amount regarding each of the first equalizer 70 and the second equalizer 72. A combination of the tap coefficient and the deviation amount is, for example, a combination obtained in advance as a combination of the tap coefficient and the deviation amount, with which the best composite data is obtained by the adder 44, based on the result obtained by performing at least one of the test performed with a real machine or a simulation. The "best composite data" here indicates data corresponding to the reading target track data.

Here, the "reading target track data" indicates "data derived from the reading target track 30A" according to the technology of the present disclosure. The "data derived from the reading target track 30A" indicates data corresponding to data written on the reading target track 30A. As an example of the data written on the reading target track 30A, data which is read from the reading target track 30A and to which a noise component from the adjacent tracks is not mixed is used.

Here, the association table 18A is used as an example, but the technology of the present disclosure is not limited thereto, and an arithmetic expression may be used instead of the association table 18A. The "arithmetic expression" here indicates an arithmetic expression in which an independent variable is set as the deviation amount and a dependent variable is set as the tap coefficient, for example.

In the embodiment of the present disclosure, the aspect in which the tap coefficient is derived from the association table 18A, in which combinations of the tap coefficients and the deviation amounts are regulated, has been described, but the technology of the present disclosure is not limited thereto. For example, the tap coefficient may be derived from the association table in which the combinations of tap coefficients and ratios are regulated, or the arithmetic expression. The "ratio" here indicates a ratio between an overlapping region with the reading target track 30A and an overlapping region with the adjacent track, regarding each of the first reading element 40 and the second reading element 42. The ratio is calculated and specified from the deviation amount by the control device 18 and the tap coefficient is determined in accordance with the specified ratio.

The decoding unit 69 decodes the composite data input from the adder 44 and outputs a decoded signal obtained by the decoding to the computer 73. The computer 73 performs various processes with respect to the decoded signal input from the decoding unit 69.

Next, a magnetic tape reading process carried out by the extraction unit 62 will be described with reference to FIG. 9, as an operation of a portion of the magnetic tape reading apparatus 10 according to the technology of the present disclosure.

Hereinafter, for convenience of description, the embodiment is described based on assumption that the servo signal is input to the control device 18, in a case where a period of the sampling comes. Here, the sampling is not limited to the sampling of the servo signal and also means the sampling of the reading signal. That is, in the embodiment of the present disclosure, the track region 30 is formed in parallel with the servo pattern 32 along the running direction, and accordingly, the reading operation by the reading element unit 38 is performed synchronously with the reading operation by the servo element pair 36.

Figure 9:
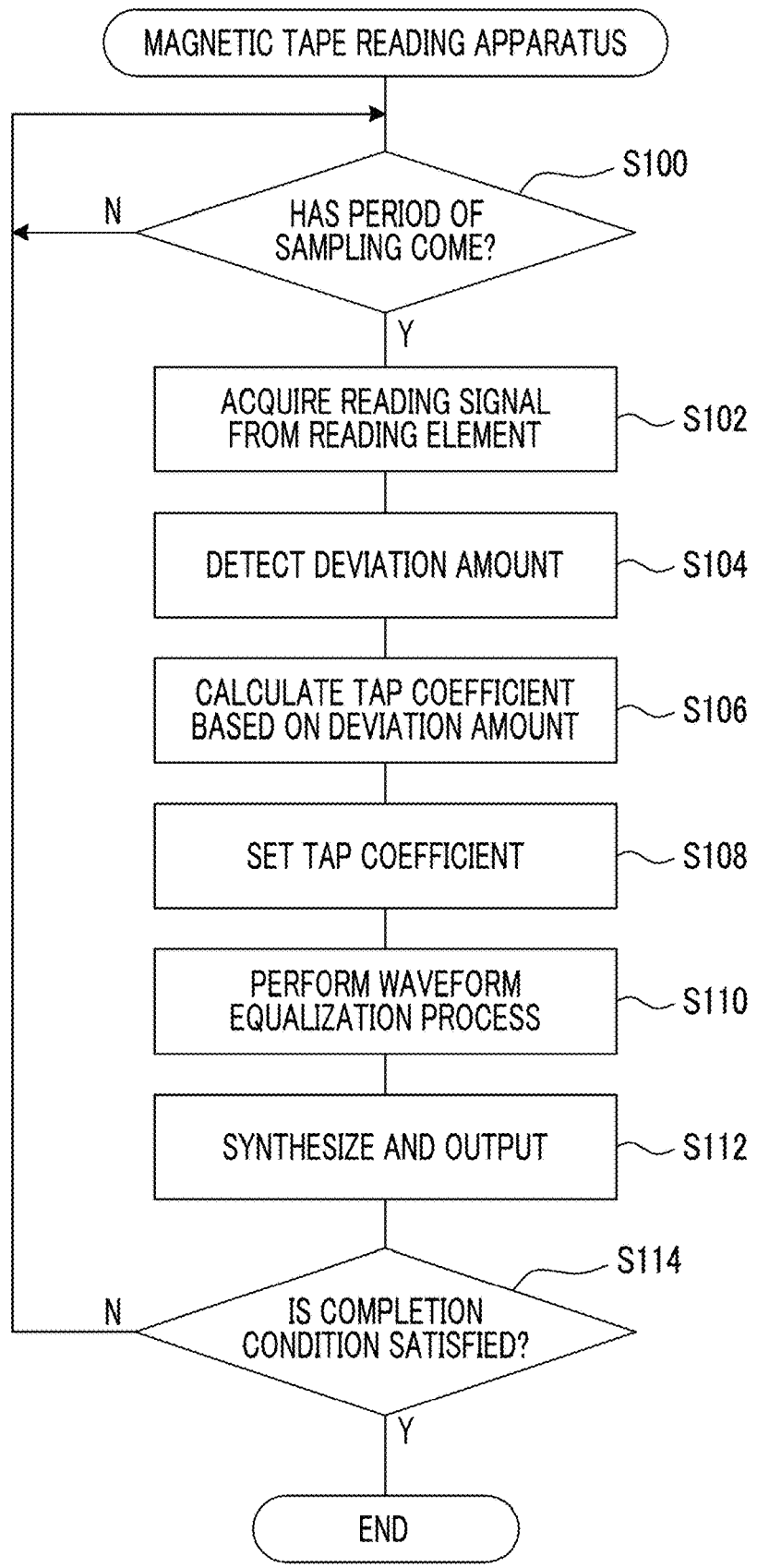
FIG. 9 is a flowchart showing an example of a flow of a magnetic tape reading process according to the embodiment.

In the process shown in FIG. 9, first, in a step S100, the control device 18 determines whether or not the period of the sampling comes. In the step S100, in a case where the period of the sampling comes, the determination is affirmative and the magnetic tape reading process moves to a step S102. In the step S100, in a case where the period of the sampling does not come, the determination is denied, and the determination of the step S100 is performed again.

In a step S102, the first equalizer 70 acquires a first reading signal, the second equalizer 72 acquires a second reading signal, and then, the magnetic tape reading process moves to a step S104.

In the step S104, the control device 18 acquires a servo signal and calculates a deviation amount from the acquired servo signal, and then the magnetic tape reading process moves to a step S106.

In the step S106, the control device 18 calculates a tap coefficient corresponding to the deviation amount calculated in the process of the step S104 from the association table 18A, regarding first to third taps of each of the first equalizer 70 and the second equalizer 72. That is, by performing the process of the step S106, an optimal combination is determined as a combination of a one-dimensional FIR filter which is an example of the first equalizer 70 and a one-dimensional filter which is an example of the second equalizer 72. The "optimal combination" here indicates, for example, a combination in which the composite data output by performing a process of a step S112 which will be described later is set as data corresponding to the reading target track data.

In the next step S108, the control device 18 sets the tap coefficient calculated in the process of the step S106 with respect to each of the first equalizer 70 and the second equalizer 72, and then the magnetic tape reading process moves to a step S110.

In the step S110, the first equalizer 70 performs the waveform equalization process with respect to the first reading signal acquired in the process of the step S102, and accordingly, the first arithmetic operation processed signal is generated. The first equalizer 70 outputs the generated first arithmetic operation processed signal to the adder 44. The second equalizer 72 performs the waveform equalization process with respect to the second reading signal acquired in the process of the step S102, and accordingly, the second arithmetic operation processed signal is generated. The second equalizer 72 outputs the generated second arithmetic operation processed signal to the adder 44.

Figure 10:
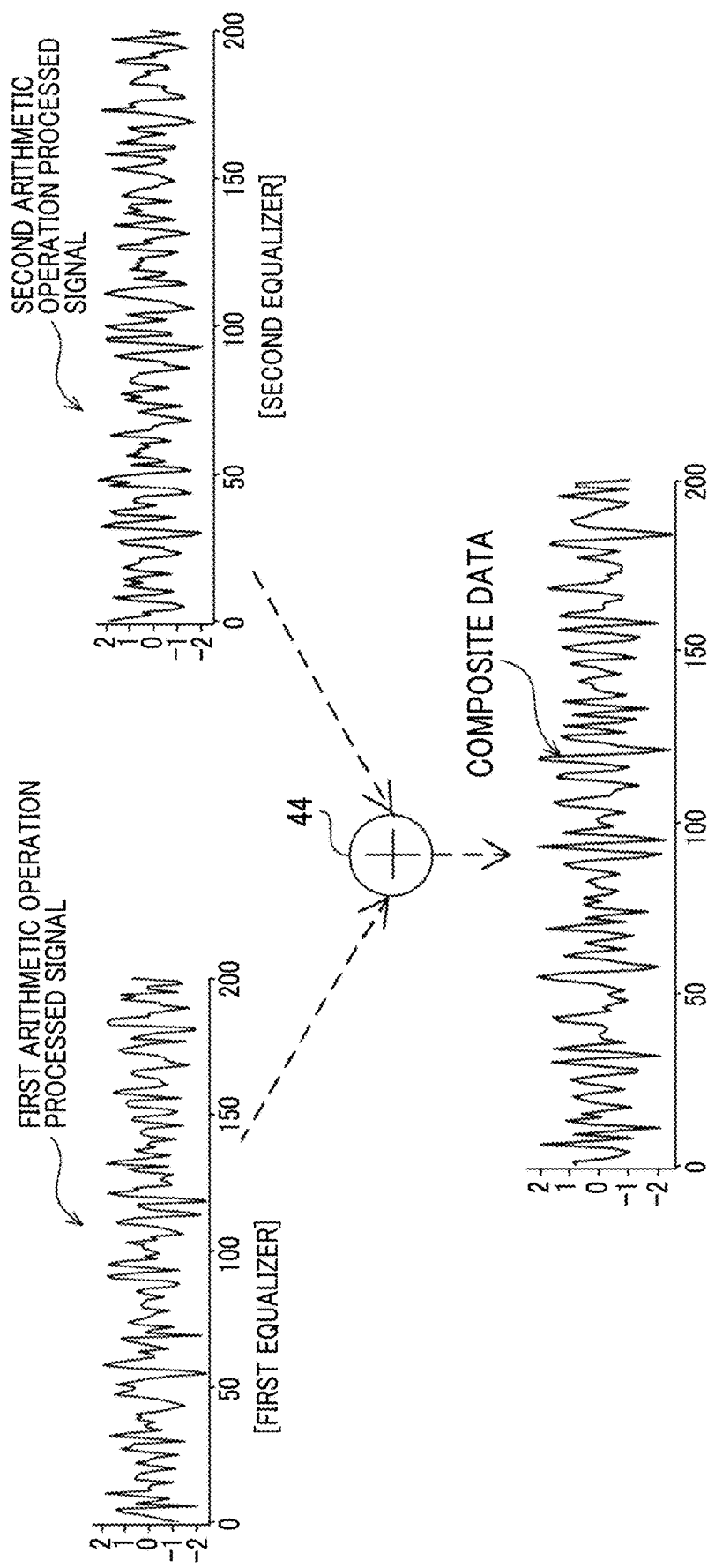
FIG. 10 is a conceptual view provided for description of a process performed by two-dimensional FIR filter of an extraction unit according to the embodiment.

In the next step S112, the adder 44 adds and composes the first arithmetic operation processed signal input from the first equalizer 70 and the second arithmetic operation processed signal input from the second equalizer 72, as shown in FIG. 10 as an example. The adder 44 outputs the composite data obtained by the composite to the decoding unit 69.

in a case where the reading element unit 38 is disposed in the specific track region 31, as the example shown in FIG. 3, the data corresponding to the reading target track data, from which the noise component from the first noise mixing source track 30B is removed, is output as the composite data, by performing the process of the step S112. That is, by performing the process of the step S102 to the step S112, the extraction unit 62 extracts only the data derived from the reading target track 30A.

Figure 11:
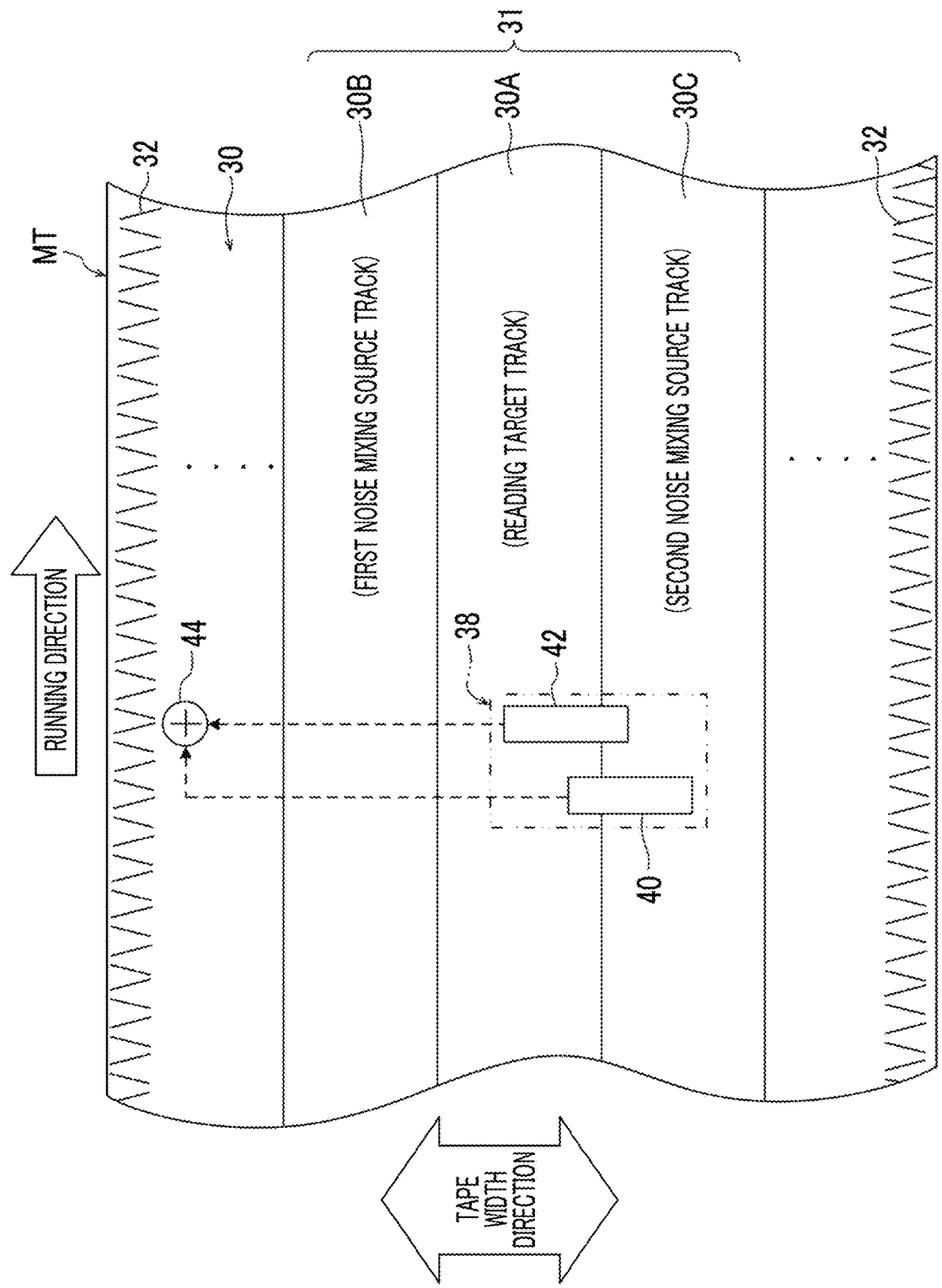
FIG. 11 is a schematic plan view showing an example of a state where the reading element unit according to the embodiment straddles over a reading target track and a second noise mixing source track.

In a case where the magnetic tape MT expands and contracts in the tape width direction or vibration is applied to at least one of the magnetic tape MT or the reading head 16, the reading element unit 38 is displaced to a position shown in FIG. 11 from the position shown in FIG. 3 as an example. In the example shown in FIG. 11, the first reading element 40 and the second reading element 42 are disposed at positions straddling over both of the reading target track 30A and the second noise mixing source track 30C. In this case, by performing the process of the step S102 to the step S112, the data corresponding to the reading target track data, from which the noise component from the second noise mixing source track 30C is removed, is output to the decoding unit 69 as the composite data.

In the next step S114, the control device 18 determines whether or not a condition for completing the magnetic tape reading process (hereinafter, referred to as a "completion condition") is satisfied. The completion condition indicates, for example a condition in which the entire magnetic tape MT is wound around the winding reel 22, a condition in which an instruction for forced completion of the magnetic tape reading process is applied from the outside, and the like.

In the step S114, in a case where the completion condition is not satisfied, the determination is denied, and the magnetic tape reading process is moved to the step S100. In the step S114, in a case where the completion condition is satisfied, the determination is affirmative, and the magnetic tape reading process ends.

As described above, in the magnetic tape reading apparatus 10, the data from the specific track region 31 is read by each of the first reading element 40 and the second reading element 42 disposed in a state of being adjacent to each other. In addition, the extraction unit 62 performs the waveform equalization process according to the deviation amount with respect to each of the first reading element 40 and the second reading element 42, to extract the data derived from the reading target track 30A from the first reading signal and the second reading signal. Therefore, in the magnetic tape reading apparatus 10, it is possible to prevent a deterioration in reliability of data read from the reading target track 30A by the linear scanning method, compared to a case where the data is read from the reading target track 30A only by a single reading element by the linear scanning method.

In the magnetic tape reading apparatus 10, parts of the first reading element 40 and the second reading element 42 are overlapped each other in the running direction. Therefore, in the magnetic tape reading apparatus 10, it is possible to increase reliability of data read from the reading target track 30A by the linear scanning method, compared to a case where the entire portions of the plurality of reading elements are overlapped in the running direction.

In the magnetic tape reading apparatus 10, the specific track region 31 is the reading target track 30A, the first noise mixing source track 30B, and the second noise mixing source track 30C, and each of the first reading element 40 and the second reading element 42 straddles over both of the reading target track 30A and the adjacent track, in a case where a positional relationship with the magnetic tape MT is changed. Therefore, in the magnetic tape reading apparatus 10, it is possible to reduce the noise component generated in one of the reading element of the first reading element 40 and the second reading element 42 due to entering the adjacent track from the reading target track 30A in the tape width direction, by using the reading result obtained by the other reading element entering the adjacent track from the reading target track 30A in the tape width direction, compared to a case where the data is read by only the single reading element from the reading target track 30A by the linear scanning method.

In the magnetic tape reading apparatus 10, the tap coefficient used in the waveform equalization process is determined in accordance with the deviation amount. Therefore, in the magnetic tape reading apparatus 10, it is possible to instantaneously reduce the noise component generated due to the entering the reading target track 30A from the adjacent track in the tape width direction, in accordance with a change of the positional relationship between the magnetic tape MT and the reading element unit 38, compared to a case where the tap coefficient is determined in accordance with a parameter with no relation with the deviation amount.

In the magnetic tape reading apparatus 10, regarding each of the first reading element 40 and the second reading element 42, the ratio between the overlapping region with the reading target track 30A and the overlapping region with the adjacent track is specified from the deviation amount, and the tap coefficient according to the specified ratio is determined. Therefore, in the magnetic tape reading apparatus 10, it is possible to exactly reduce the noise component, even in a case where the positional relationship between the magnetic tape MT and the reading element unit 38 is changed, compared to a case where the tap coefficient is determined in accordance with a parameter with no relation with a ratio between the overlapping region with the reading target track 30A and the overlapping region with the adjacent track regarding each of the plurality of reading elements.

In the magnetic tape reading apparatus 10, the deviation amount is determined in accordance with the result obtained by reading the servo patterns 32 by the servo element pair 36. Therefore, in the magnetic tape reading apparatus 10, it is possible to easily determine the deviation amount, compared to a case where the servo patterns 32 are not applied to the magnetic tape MT.

In the magnetic tape reading apparatus 10, the reading operation by the reading element unit 38 is performed synchronously with the reading operation by the servo element pair 36. Therefore, in the magnetic tape reading apparatus 10, it is possible to instantaneously reduce the noise component generated due to the entering the reading target track from the adjacent track in the width direction of the magnetic tape, compared to a case of a magnetic disk and a magnetic tape in a helical scanning method, in which a servo pattern and data cannot be synchronously read.

In the magnetic tape reading apparatus 10, the extraction unit 62 includes the two-dimensional FIR filter 71. Each result obtained by performing the waveform equalization process with respect to each of the first reading signal and the second reading signal is composed by the two-dimensional FIR filter 71, and accordingly, the data derived from the reading target track 30A is extracted from the first reading signal and the second reading signal. Therefore, in the magnetic tape reading apparatus 10, it is possible to rapidly extract the data derived from the reading target track 30A from the first reading signal and the second reading signal, compared to a case of using only a one-dimensional FIR filter. In addition, in the magnetic tape reading apparatus 10, it is possible to realize simple implementation due to a smaller operation amount, compared to a case of performing a matrix operation.

In the magnetic tape reading apparatus 10, the first reading element 40 and the second reading element 42 are used as a pair of reading elements according to the technology of the present disclosure. Therefore, in the magnetic tape reading apparatus 10, it is possible to contribute to miniaturization of the reading element unit 38, compared to a case of using three reading elements. By miniaturizing the reading element unit 38, the reading unit 26 and the reading head 16 can also be miniaturized. In addition, in the magnetic tape reading apparatus 10, it is possible to prevent occurrence of a situation in which the reading element units 38 adjacent to each other are in contact with each other.

In the magnetic tape reading apparatus 10, each of the plurality of reading element units 38 reads data from the corresponding reading target track 30A included in each of the plurality of specific track regions 31 by the linear scanning method. Therefore, in the magnetic tape reading apparatus 10, it is possible to rapidly complete the reading of data from the plurality of reading target tracks 30A, compared to a case where the data is read by only the single reading element unit 38 from each of the plurality of reading target tracks 30A.

In the embodiment, in a default state of the magnetic tape reading apparatus 10, each of the first reading element 40 and the second reading element 42 are provided to straddle over both of the reading target track 30A and the first noise mixing source track 30B, but the technology of the present disclosure is not limited thereto. In an example shown in FIG. 12, a reading element unit 138 is used instead of the reading element unit 38 described in the embodiment. The reading element unit 138 comprises a first reading element 140 and a second reading element 142. In a default state of the magnetic tape reading apparatus 10, the center of the first reading element 140 in the tape width direction coincides with a center CL of the reading target track 30A in the tape width direction. In a default state of the magnetic tape reading apparatus 10, the first reading element 140 and the second reading element 142 fall in the reading target track 30A, without being protruded to the first noise mixing source track 30B and the second noise mixing source track 30C. In addition, in a default state of the magnetic tape reading apparatus 10, parts of the first reading element 140 and the second reading element 142 are provided to be overlapped each other in the running direction, in the same manner as the case of the first reading element 40 and the second reading element 42 described in the embodiment.

Figure 12:
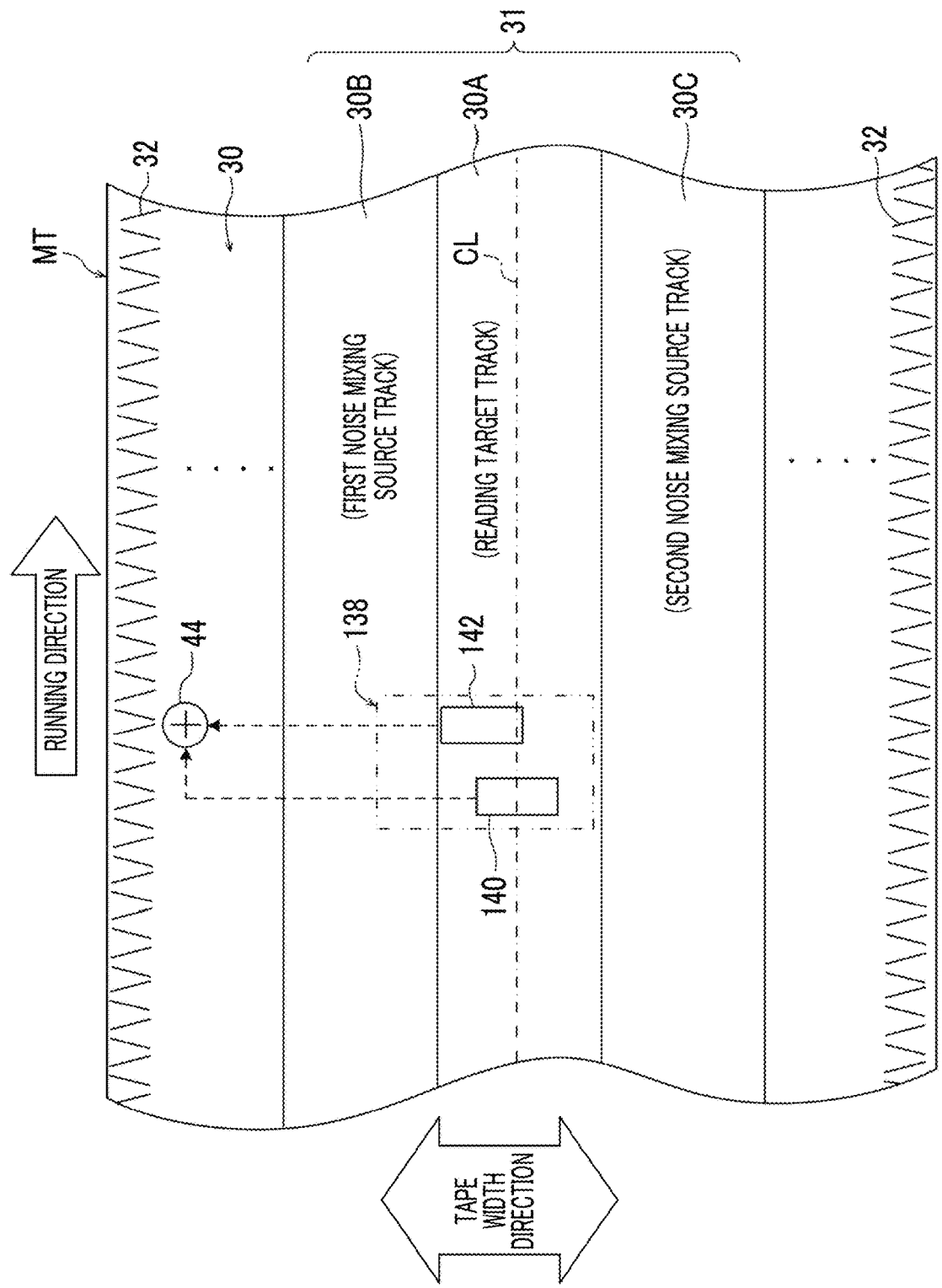
FIG. 12 is a schematic plan view showing a first modification example of the reading element unit according to the embodiment.

As shown in FIG. 12 as an example, even in a state where the first reading element 140 and the second reading element 142 face the reading target track 30A, without being protruded from the reading target track 30A, a positional relationship between the reading element unit 138 and the magnetic tape MT may be changed. That is, the reading element unit 138 may straddle over the reading target track 30A and the first noise mixing source track 30B, or the reading element unit 138 may straddle over the reading target track 30A and the second noise mixing source track 30C. Even in these cases, by performing the processes in the step S102 to the step S112 described above, it is possible to obtain the data corresponding to the reading target track data, from which the noise component from the first noise mixing source track 30B or the second noise mixing source track 30C is removed.

In addition, parts of the first reading element 140 and the second reading element 142 are disposed at position to be overlapped each other in the running direction, and accordingly, the second reading element 142 can read the data from a portion of the reading target track 30A where the reading cannot be performed by the first reading element 140. As a result, it is possible to increase reliability of the reading target track data, compared to a case where the first reading element 140 singly reads the data from the reading target track 30A.

As shown in FIG. 11 as an example, in a default state of the magnetic tape reading apparatus 10, each of the first reading element 40 and the second reading element 42 may be disposed at a position to straddle over both of the reading target track 30A and the second noise mixing source track 30C.

In the embodiment, the reading element unit 38 including the first reading element 40 and the second reading element 42 has been described, but the technology of the present disclosure is not limited thereto. In an example shown in FIG. 13, a reading element unit 238 may be used instead of the reading element unit 38. The reading element unit 238 is different from the reading element unit 38, in a point that a third reading element 244 is included. In a default state of the magnetic tape reading apparatus 10, the third reading element 244 is disposed at a position where a part thereof is overlapped with a part of the first reading element 40 in the running direction. In addition, in a default state of the magnetic tape reading apparatus 10, the third reading element 244 is disposed at a position to straddle over the reading target track 30A and the second noise mixing source track 30C.

In this case, a third equalizer (not shown) is also allocated to the third reading element 244, in the same manner as that the first equalizer 70 is allocated to the first reading element 40 and the second equalizer 72 is allocated to the second reading element 42. The third equalizer also has the same function as that of the first equalizer 70 and the second equalizer 72 described in the embodiment, and performs a waveform equalization process with respect to a third reading signal obtained by reading performed by the third reading element 244. The third equalizer performs a convolution arithmetic operation of a tap coefficient with respect to the third reading signal and outputs the third arithmetic operation processed signal which is a signal after the arithmetic operation. The adder 44 adds and composes a first arithmetic operation processed signal corresponding to the first reading signal, a second arithmetic operation processed signal corresponding to the second reading signal, the third arithmetic operation processed signal corresponding to the third reading signal, and outputs the composite data obtained by the composite to the decoding unit 69.

Figure 13:
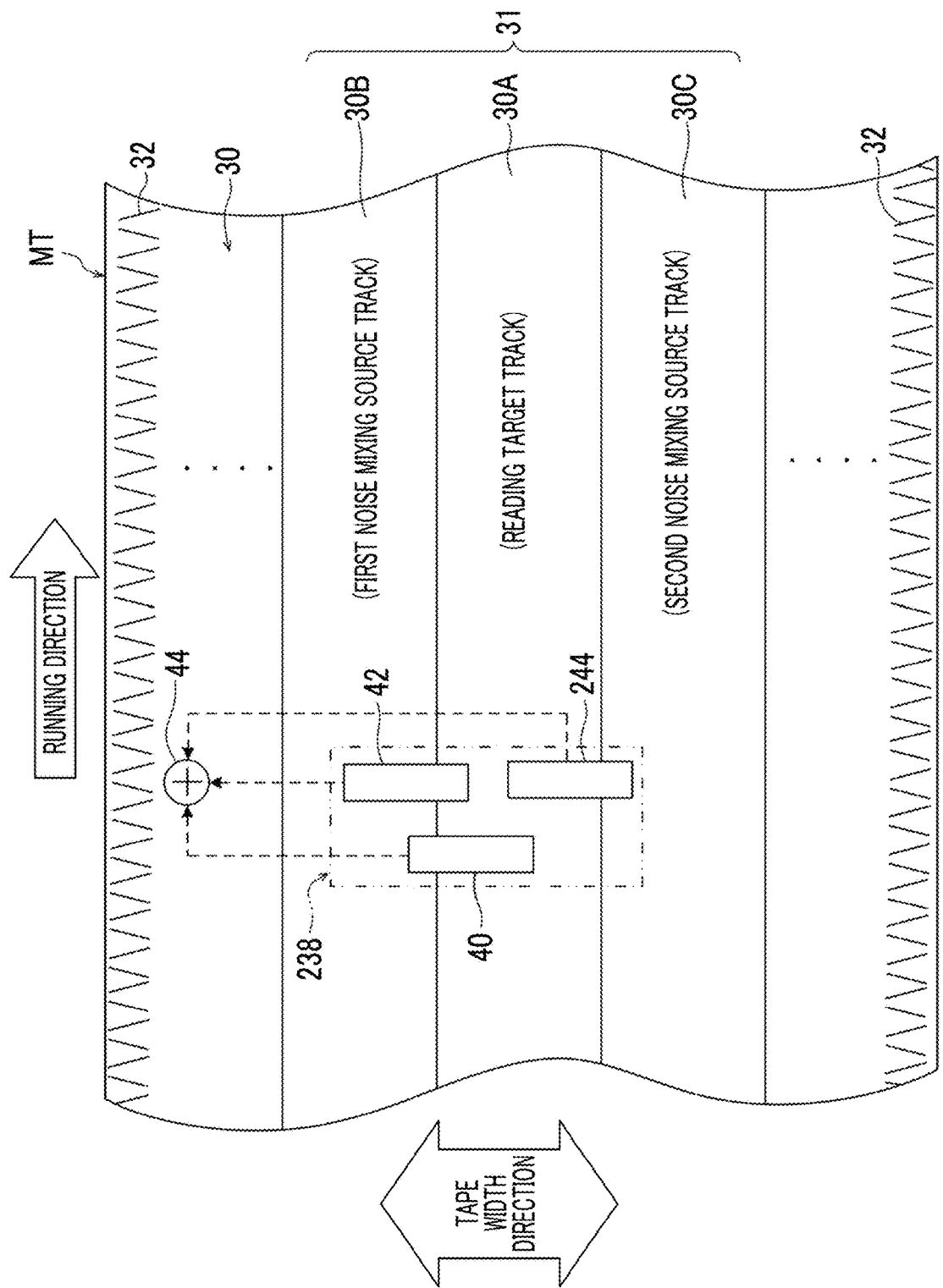
FIG. 13 is a schematic plan view showing a second modification example of the reading element unit according to the embodiment.
Figure 14:
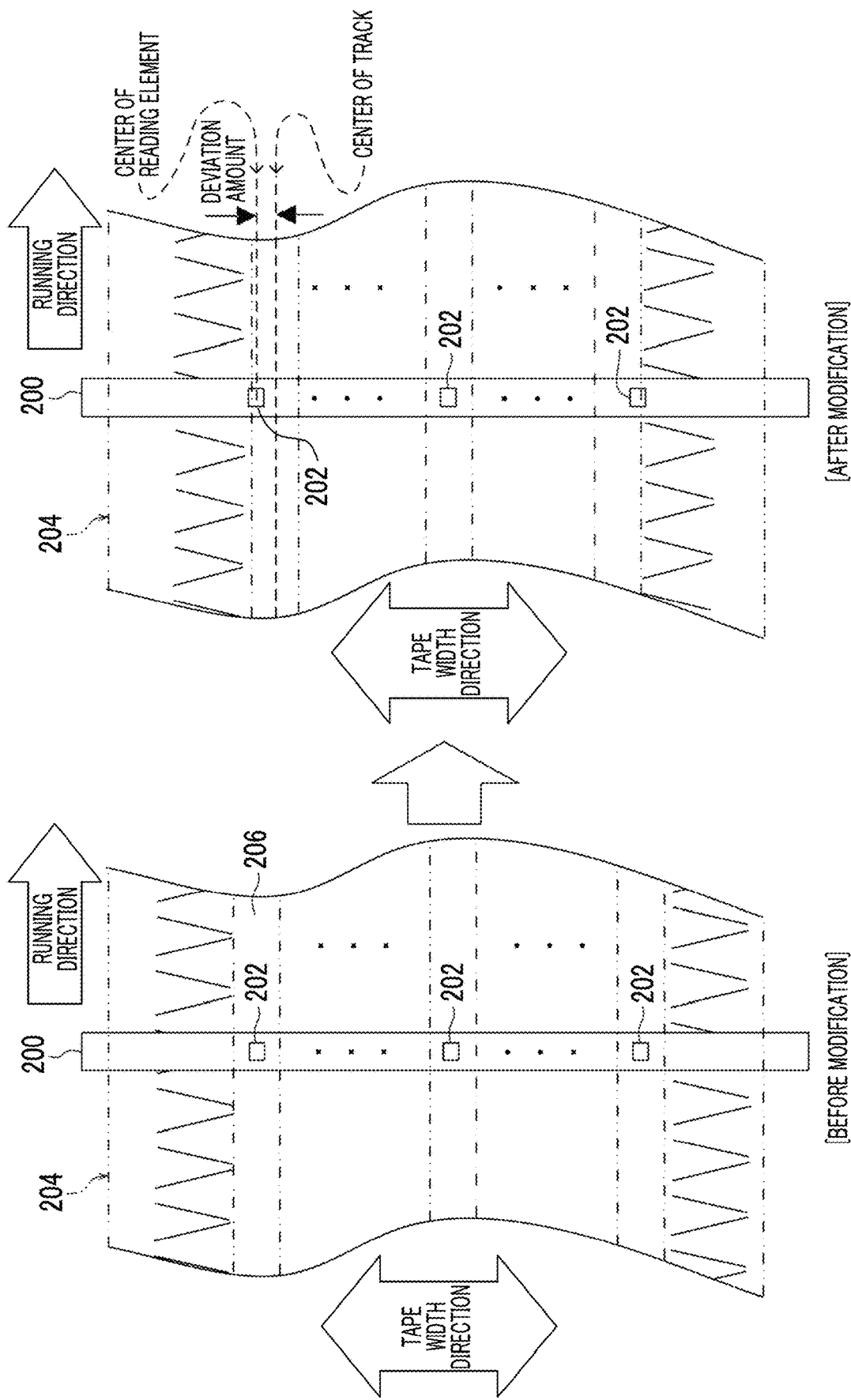
FIG. 14 is a conceptual view provided for description of a first example of the related art.
Figure 15:
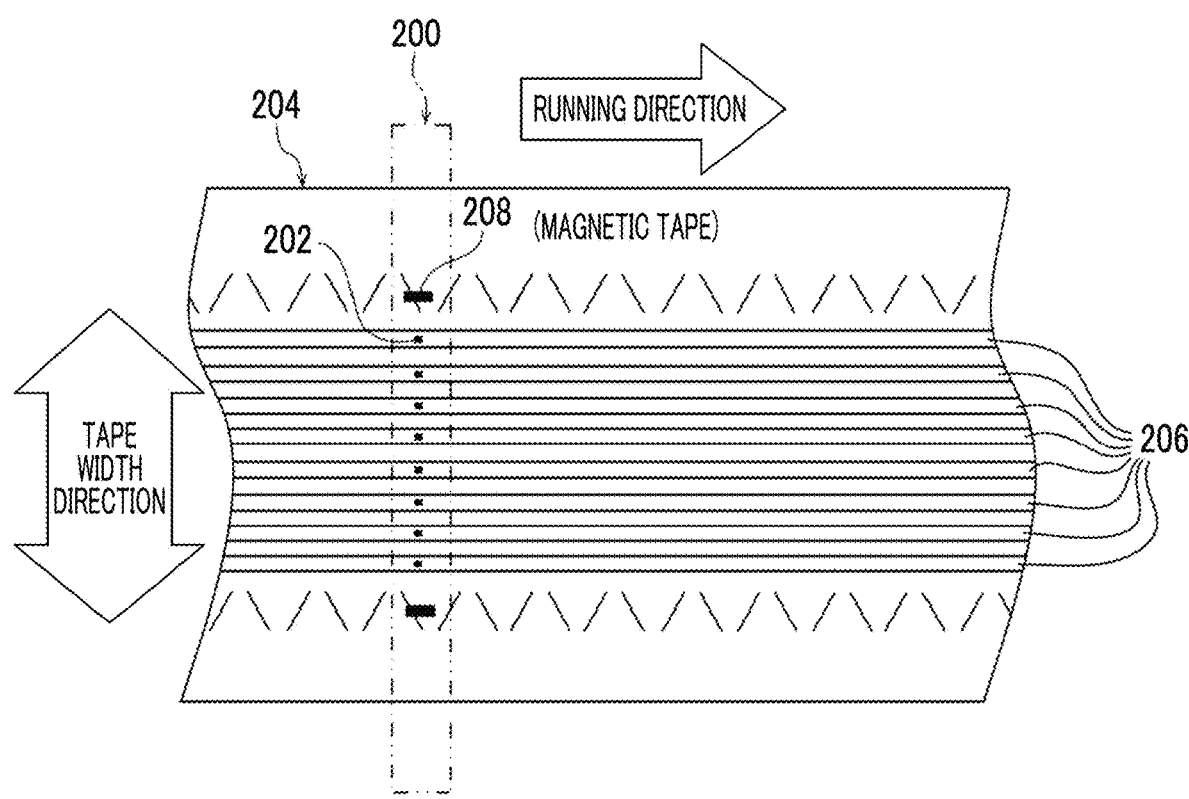
FIG. 15 is a conceptual view provided for description of a second example of the related art.

In the example shown in FIG. 13, in a default state of the magnetic tape reading apparatus 10, the third reading element 244 is disposed at the position straddling over the reading target track 30A and the second noise mixing source track 30C, but the technology of the present disclosure is not limited thereto. In a default state of the magnetic tape reading apparatus 10, the third reading element 244 may be disposed at the position facing the reading target track 30A, without being protruded from the reading target track 30A.

In the embodiment, the reading element unit 38 has been described, but the technology of the present disclosure is not limited thereto. For example, the reading element pair 50 shown in FIG. 4 may be used instead of the reading element unit 38. In this case, the first reading element 50A and the second reading element 50B are set to be disposed at positions adjacent to each other in the tape width direction. In addition, the first reading element 50A and the second reading element 50B are set to be disposed in a line in the tape width direction so that the SNR is higher than the SNR of the single reading element data over the entire range of the track off-set, as shown in FIG. 6 as an example, without being in contact with each other.

In the example shown in FIG. 4, for example, the first reading element 50A falls in the second track 49B in a plan view, and the second reading element 50B falls in the first track 49A in a plan view.

In the embodiment, the servo element pair 36 has been described, but the technology of the present disclosure is not limited thereto, and for example, one of the servo elements 36A and 36B may be used instead of the servo element pair 36.

In the embodiment, the aspect in which the plurality of specific track regions 31 are arranged in the track region 30 at regular interval in the tape width direction has been described, but the technology of the present disclosure is not limited thereto. For example, in two specific track regions 31 adjacent to each other in the plurality of specific track regions 31, one specific track region 31 and the other specific track region 31 may be arranged in the tape width direction so as to be overlapped by the area of one track in the tape width direction. That is, in this case, one adjacent track included in one specific track region 31 (for example, first noise mixing source track 30B) becomes the reading target track 30A in the other specific track region 31. In addition, the reading target track 30A included in one specific track region 31 becomes the adjacent track region (for example, second noise mixing source track 30C) in the other specific track region 31.

The magnetic tape reading process described in the embodiment is merely an example. Accordingly, unnecessary steps may be removed, new steps may be added, and the process procedure may be changed, within a range not departing from the gist.

In a case where all of documents, patent applications, and technical standard described in the specification are incorporated in the specification as references, each of documents, patent applications, and technical standard is incorporated in the specification by references specifically and to the same degree as a case where the incorporation of each of documents, patent applications, and technical standard as references is and individually noted.

Regarding the above embodiment, the following appendix is disclosed.

APPENDIX 1

A magnetic tape reading method comprising:

disposing a reading element unit including a plurality of reading elements in a state where the plurality of reading elements are adjacent to each other;

causing the plurality of reading elements to read data by a linear scanning method from a specific track region including a reading target track in a track region included in a magnetic tape; and causing an extraction unit to perform a waveform equalization process according to a deviation amount between positions of the magnetic tape and the reading element unit, with respect to each reading result for each reading element, to extract data derived from the reading target track from the reading result.

APPENDIX 2

A magnetic tape reading method comprising:

disposing a reading element unit which includes a plurality of reading elements each of which reads data by a linear scanning method from a specific track region including a reading target track in a track region included in a magnetic tape, in a state where the plurality of reading elements are adjacent to each other; and causing an extraction unit to perform a waveform equalization process according to a deviation amount between positions of the magnetic tape and the reading element unit, with respect to each reading result for each reading element, to extract data derived from the reading target track from the reading result.

APPENDIX 3

The magnetic tape reading method according to Appendix 1 or 2, in which parts of the plurality of reading elements are overlapped each other in a running direction of the magnetic tape.

APPENDIX 4

The magnetic tape reading method according to Appendix 3, in which the specific track region is a region including the reading target track and adjacent tracks which are adjacent to the reading target track, and each of the plurality of reading elements straddles over both of the reading target track and the adjacent track, in a case where a positional relationship with the magnetic tape is changed.

APPENDIX 5

A magnetic tape reading apparatus comprising:

a plurality of reading element units each of which includes a plurality of reading elements which are disposed in a state of being adjacent to each other and each of which reads data from each of a plurality of specific track regions including each of reading target tracks in a track region included in a magnetic tape by a linear scanning method; and an extraction unit which performs a waveform equalization process according to a deviation amount between positions of the magnetic tape and the reading element unit, with respect to each reading result for each reading element, regarding each of the plurality of reading element units, to extract data derived from the reading target track from the reading result.

APPENDIX 6

The magnetic tape reading apparatus according to Appendix 5, in which parts of the plurality of reading elements in each of the plurality of reading element units are overlapped each other in a running direction of the magnetic tape.

APPENDIX 7

The magnetic tape reading apparatus according to Appendix 6, in which the specific track region is a region including the reading target track and adjacent tracks which are adjacent to the reading target track, and each of the plurality of reading elements in each of the plurality of reading element units straddles over both of the reading target track and the adjacent track, in a case where a positional relationship with the magnetic tape is changed.

APPENDIX 8

The magnetic tape reading apparatus according to Appendix 5, in which the plurality of reading elements in each of the plurality of reading element units are disposed in a line in a state of being adjacent to each other, in a width direction of the magnetic tape.

APPENDIX 9

The magnetic tape reading apparatus according to any one of Appendix 5 to 8, in which the plurality of reading elements in each of the plurality of reading element units fall in the reading target track in the width direction of the magnetic tape.

APPENDIX 10

The magnetic tape reading apparatus according to any one of Appendix 5 to 9, in which a tap coefficient used in the waveform equalization process is determined in accordance with the deviation amount.

APPENDIX 11

The magnetic tape reading apparatus according to Appendix 10, in which, regarding each of the plurality of reading elements of each of the plurality of reading element units, a ratio between an overlapping region with the reading target track and an overlapping region with the adjacent track which is adjacent to the reading target track, is specified from the deviation amount, and the tap coefficient is determined in accordance with the specified ratio.

APPENDIX 12

The magnetic tape reading apparatus according to any one of Appendix 5 to 11, in which the deviation amount is determined in accordance with a result obtained by reading a servo pattern applied to the magnetic tape in advance, by a servo element.

APPENDIX 13

The magnetic tape reading apparatus according to Appendix 12, in which the reading operation by each of the plurality of reading element units is performed synchronously with the reading operation by the servo element.

APPENDIX 14

The magnetic tape reading apparatus according to any one of Appendix 5 to 13, in which the extraction unit includes a two-dimensional FIR filter, and the two-dimensional FIR filter composes each result obtained by performing the waveform equalization process with respect to each reading result for each reading element, regarding each of the plurality of reading element units, to extract data derived from the reading target track included in the specific track region at the corresponding position among the plurality of specific track regions, from the reading result.

APPENDIX 15

The magnetic tape reading apparatus according to any one of Appendix 5 to 14, in which the plurality of reading elements are a pair of reading elements.

What is claimed is:

1. A magnetic tape reading apparatus comprising:
 a reading element unit which includes a plurality of reading elements which are disposed in a state of being adjacent to each other and each of which reads data by a linear scanning method from a specific track region including a reading target track in a track region included in a magnetic tape; and
 an extraction unit which performs a waveform equalization process according to a deviation amount between positions of the magnetic tape and the reading element unit, with respect to each reading result for each reading element, to extract data derived from the reading target track from the reading result,
 wherein parts of the plurality of reading elements are overlapped each other in a running direction of the magnetic tape.

2. The magnetic tape reading apparatus according to claim 1,
 wherein the specific track region is a region including the reading target track and adjacent tracks which are adjacent to the reading target track, and
 each of the plurality of reading elements straddles over both of the reading target track and the adjacent track, in a case where a positional relationship with the magnetic tape is changed.

3. The magnetic tape reading apparatus according to claim 1,
 wherein the plurality of reading elements are disposed in a line in a state of being adjacent to each other, in a width direction of the magnetic tape.

4. The magnetic tape reading apparatus according to claim 1,
 wherein the plurality of reading elements fall in the reading target track in the width direction of the magnetic tape.

5. The magnetic tape reading apparatus according to claim 1,
 wherein the deviation amount is determined in accordance with a result obtained by reading a servo pattern applied to the magnetic tape in advance, by a servo element.

6. The magnetic tape reading apparatus according to claim 5,
 wherein the reading operation by the reading element unit is performed synchronously with the reading operation by the servo element.

7. The magnetic tape reading apparatus according to claim 1,
 wherein the extraction unit includes a two-dimensional FIR filter, and
 the two-dimensional FIR filter composes each result obtained by performing the waveform equalization process with respect to each reading result for each reading element, to extract data derived from the reading target track from the reading result.

8. The magnetic tape reading apparatus according to claim 1,
 wherein the plurality of reading elements are a pair of reading elements.

9. A magnetic tape reading apparatus comprising:
 a reading element unit which includes a plurality of reading elements which are disposed in a state of being adjacent to each other and each of which reads data by a linear scanning method from a specific track region including a reading target track in a track region included in a magnetic tape; and
 an extraction unit which performs a waveform equalization process according to a deviation amount between positions of the magnetic tape and the reading element unit, with respect to each reading result for each reading element, to extract data derived from the reading target track from the reading result,
 wherein a tap coefficient used in the waveform equalization process is determined in accordance with the deviation amount.

10. The magnetic tape reading apparatus according to claim 9,
 wherein, regarding each of the plurality of reading elements, a ratio between an overlapping region with the reading target track and an overlapping region with the adjacent track which is adjacent to the reading target track is specified from the deviation amount, and the tap coefficient is determined in accordance with the specified ratio.

11. A magnetic tape reading apparatus comprising:
 a plurality of reading element units each of which includes a plurality of reading elements which are disposed in a state of being adjacent to each other and each of which reads data by a linear scanning method from each of a plurality of specific track regions including each of reading target tracks in a track region included in a magnetic tape; and
 an extraction unit which performs a waveform equalization process according to a deviation amount between positions of the magnetic tape and the reading element unit, with respect to each reading result for each reading element, regarding each of the plurality of reading element units, to extract data derived from the reading target track from the reading result,
 wherein parts of the plurality of reading elements are overlapped each other in a running direction of the magnetic tape.

12. A magnetic tape reading method comprising:
 disposing a reading element unit including a plurality of reading elements in a state where the plurality of reading elements are adjacent to each other;
 causing the plurality of reading elements to read data by a linear scanning method from a specific track region including a reading target track in a track region included in a magnetic tape; and
 causing an extraction unit to perform a waveform equalization process according to a deviation amount between positions of the magnetic tape and the reading element unit, with respect to each reading result for each reading element, to extract data derived from the reading target track from the reading result, wherein parts of the plurality of reading elements are overlapped each other in a running direction of the magnetic tape.

* * * * *